(12) United States Patent
Bakalash et al.

(10) Patent No.: US 6,408,292 B1
(45) Date of Patent: Jun. 18, 2002

(54) METHOD OF AND SYSTEM FOR MANAGING MULTI-DIMENSIONAL DATABASES USING MODULAR-ARITHMETIC BASED ADDRESS DATA MAPPING PROCESSES ON INTEGER-ENCODED BUSINESS DIMENSIONS

(75) Inventors: Reuven Bakalash, Beer Sheva; Guy Shaked, Shdema, both of (IL)

(73) Assignee: Hyperroll, Israel, Ltd., Rehovot (IL)

( * ) Notice: Subject to any disclaimer, the term of this patent is extended or adjusted under 35 U.S.C. 154(b) by 0 days.

(21) Appl. No.: 09/368,241

(22) Filed: Aug. 4, 1999

(51) Int. Cl.[7] .............................................. G06F 17/30
(52) U.S. Cl. ................................ 707/2; 707/3; 707/100
(58) Field of Search .......................... 707/1–5, 100–104

(56) References Cited

U.S. PATENT DOCUMENTS 4,987,554 A * 1/1991 Kaufman .................... 345/424

(List continued on next page.)

OTHER PUBLICATIONS

Albrecht, J. and Sporer, W. "Aggregate–based Query Processing in a Parallel Data Warehouse Server", Proceedings of the Tenth International Workshop on Database and Expert Systems Applications, Sep. 1–3, 1999, pp. 40–44.*

Agarwal, S, et al. "On the Computation of Multidimensional Aggregates", Proceedings of the 22nd VLDB Conference, Sep. 3–6, 1996, pp. 506–521.*

Primary Examiner—Jean R. Homere
Assistant Examiner—Luke S Wassum
(74) Attorney, Agent, or Firm—Thomas J. Perkowski Esq., P.C.

(57) ABSTRACT

An improved method of and a system for managing data elements in a multidimensional database (MDB) supported upon a parallel computing platform using modular-arithmetic based address data mapping (i.e. translation) processes on integer-encoded business dimensions. The parallel computing platform has a plurality of processors and one or more storage volumes for physically storing data elements therein at integer-encoded physical addresses in Processor Storage Space (i.e. physical address space in the one or more storage volumes associated with a given processor). The location of each data element in the MDB is specified in MDB Space by integer-encoded business dimensions associated with the data element. A data loading mechanism loads the integer-encoded business dimensions and associated data elements from a data warehouse. The address data mapping mechanism performs a two part address mapping processing. The first step maps the integer-encoded business dimensions associated with each data element to a given processor identifier (which uniquely identifies the processor amongst the plurality of processors of the parallel computing platform). The second step maps the integer-encoded business dimensions associated with each data element into an integer-encoded physical data storage address in Processor Storage Space associated with the processor identified by the processor identifier generated in the first mapping step. The mapping performed in this second step is based upon size of the integer encoded business dimensions. The data management mechanism manages the data elements stored in the storage volumes using the integer-encoded data storage addresses generated during the two-part address data mapping process. The use of modular-arithmetic functions in the two-part address data mapping mechanism ensures that the data elements in the MDB are uniformly distributed among the plurality of processors for balanced loading and processing. The present invention can be used to realize (i) an improved MDB for supporting on-line analytical processing (OLAP) operations, (ii) an improved Internet URL Directory for supporting on-line information searching operations by Web-enabled client machines, as well as (iii) diverse types of MDB-based systems for supporting real-time control of processes in response to complex states of information reflected in the MDB.

95 Claims, 43 Drawing Sheets

U.S. PATENT DOCUMENTS

| | | | | |
|---|---|---|---|---|
| 5,101,475 A | * | 3/1992 | Kaufman et al. | 345/424 |
| 5,278,966 A | * | 1/1994 | Parks et al. | 711/5 |
| 5,361,385 A | * | 11/1994 | Bakalash | 345/424 |
| 5,822,751 A | * | 10/1998 | Gray et al. | 707/3 |
| 5,832,475 A | * | 11/1998 | Agrawal et al. | 707/2 |
| 5,926,820 A | * | 7/1999 | Agrawal et al. | 707/200 |
| 6,003,029 A | * | 12/1999 | Agrawal et al. | 707/7 |
| 6,182,061 B1 | * | 1/2001 | Matsuzawa et al. | 707/2 |
| 6,209,036 B1 | * | 3/2001 | Aldred et al. | 709/229 |
| 6,212,617 B1 | * | 4/2001 | Hardwick | 712/3 |

* cited by examiner

G   geography (e.g. cities, states, countries, continents)
T   time (e.g., days, weeks, months, years)
P   products (e.g. all products, by manufacturer)

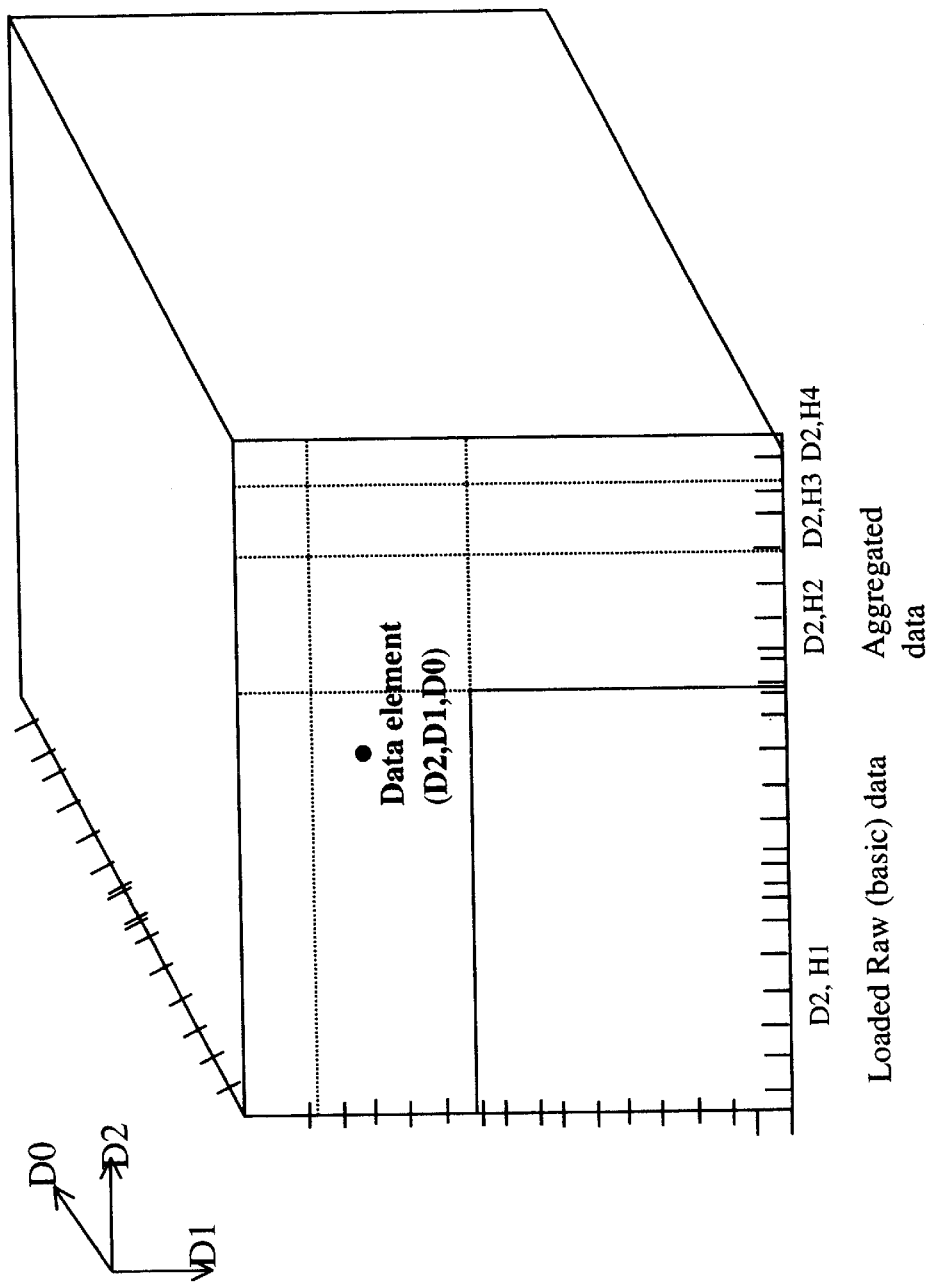
Fig. 3C1
(PRIOR ART)

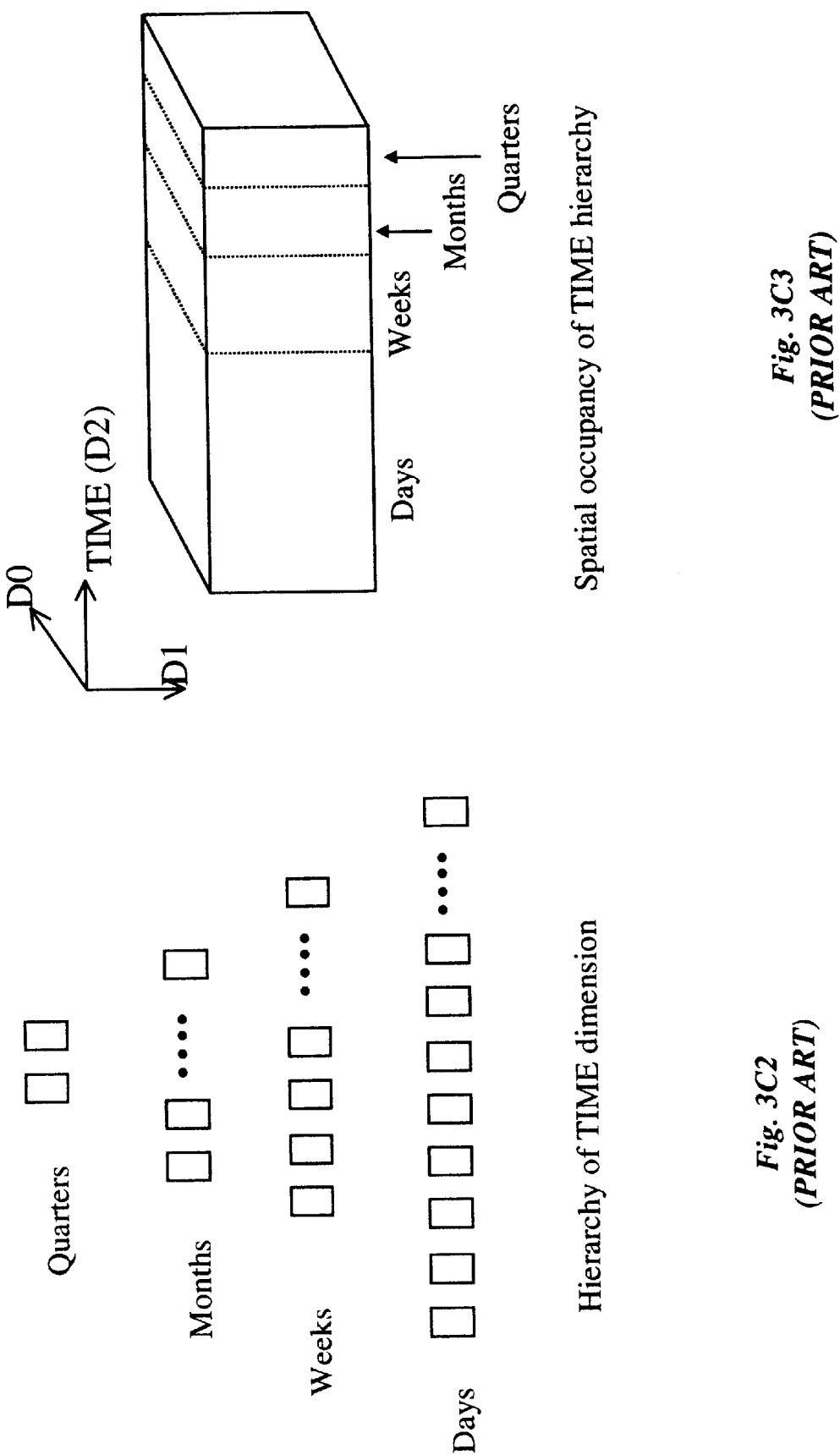
Fig. 3C3
(PRIOR ART)
Fig. 3C2
(PRIOR ART)

| Shortcoming and drawbacks encountered when carrying out data address assignment using a method of partitioning the data by splitting the lowest dimension of the MDB, and searching the MDB using a parallel machine | Shortcoming and drawbacks encountered when carrying out address assignment using a method of partitioning the data by splitting the highest dimension of the MDB, and searching the MDB using a parallel machine |
|---|---|
| • Results in unbalanced processing among processors<br>• Results in sequential, as opposed to parallel, access to data.<br>• Limited scalability | • Results in unbalanced processing among processors<br>• Results in sequential, as opposed to parallel, access to data.<br>• Limited scalability |

*Fig. 7C*

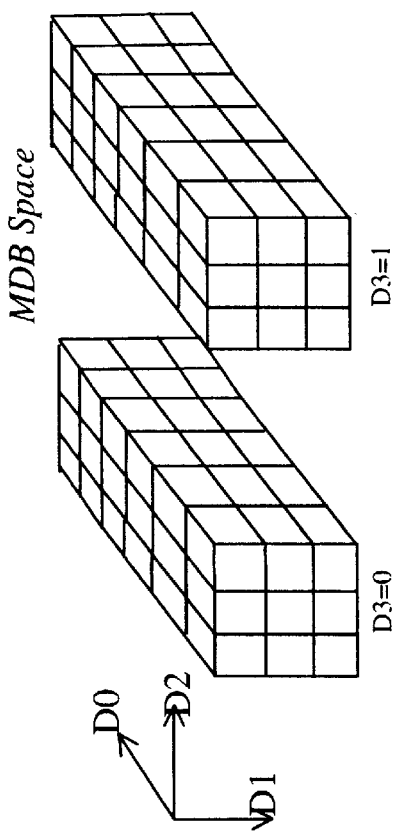
Fig. 9A1
Illustrates the result of data element address mapping during the process of data element loading carried out between a 3-D MDB and a parallel machine having 4 processors operating in accordance with the present invention.

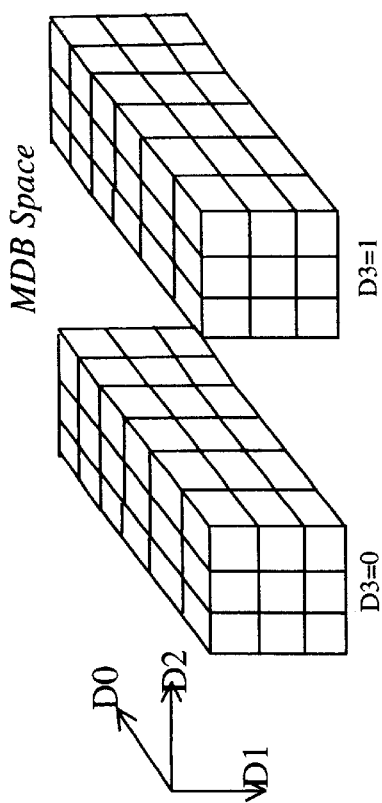
Fig. 9A2
Illustrates the result of data element address mapping during the process of data element loading carried out between a 3-D MDB and a parallel machine having 3 processors operating in accordance with the present invention.
| Proc. | Occur. |
|---|---|
| $P_0$ | 36 |
| $P_1$ | 36 |
| $P_2$ | 36 |
Table lists Processor Index $k$, to which each data element in MDB is mapped according to the Present Invention.

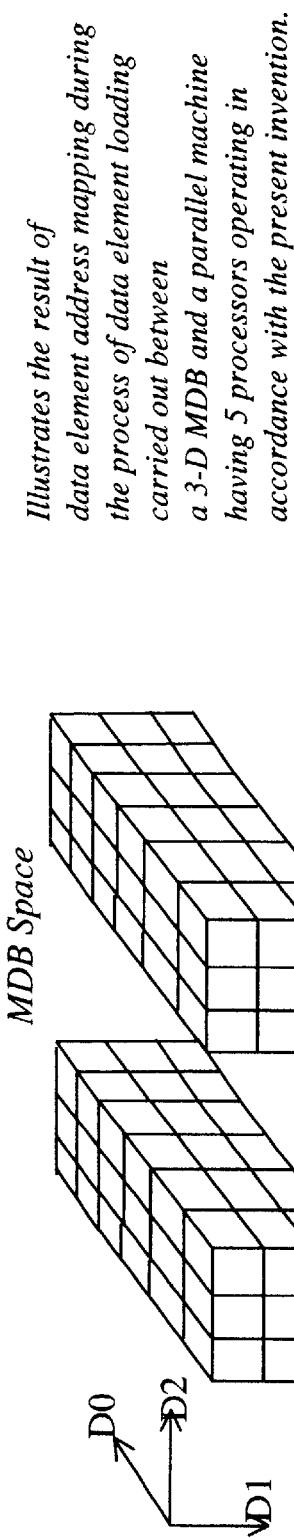

Fig. 9A3

Illustrates the result of data element address mapping during the process of data element loading carried out between a 3-D MDB and a parallel machine having 5 processors operating in accordance with the present invention.

| Proc. | Occur. |
|---|---|
| $P_0$ | 20 |
| $P_1$ | 21 |
| $P_2$ | 23 |
| $P_3$ | 23 |
| $P_4$ | 21 |

Table lists Processor Index $k$, to which each data element in MDB is mapped according to the Present Invention.

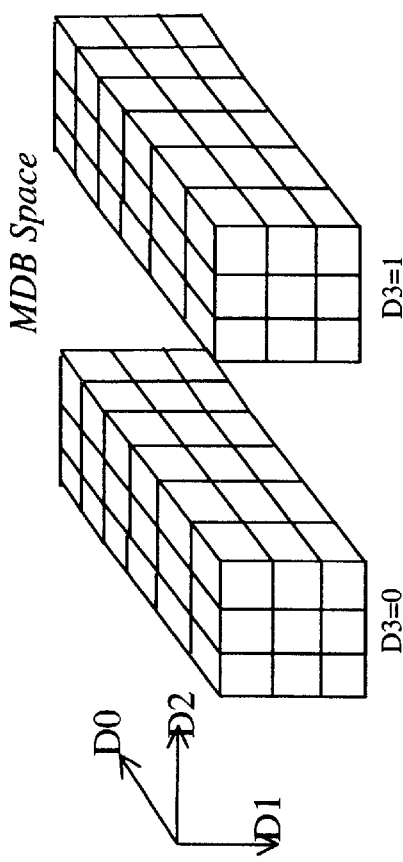

*Illustrates the result of data element address mapping during the process of data element loading carried out between a 3-D MDB and a parallel machine having 6 processors operating in accordance with the present invention.*

Table lists Processor Index k, to which each data element in MDB is mapped according to the Present Invention.

| Proc. | Occur. |
|---|---|
| $P_0$ | 18 |
| $P_1$ | 18 |
| $P_2$ | 18 |
| $P_3$ | 18 |
| $P_4$ | 18 |
| $P_5$ | 18 |

*Fig. 9A4*

Page Allocation Table of processor $P_0$ pointing on physical records (e.g. the first 12 data elements of Fig. 11A reside in page #0).

Local arrangement of processor-subspace elements in processor $P_0$

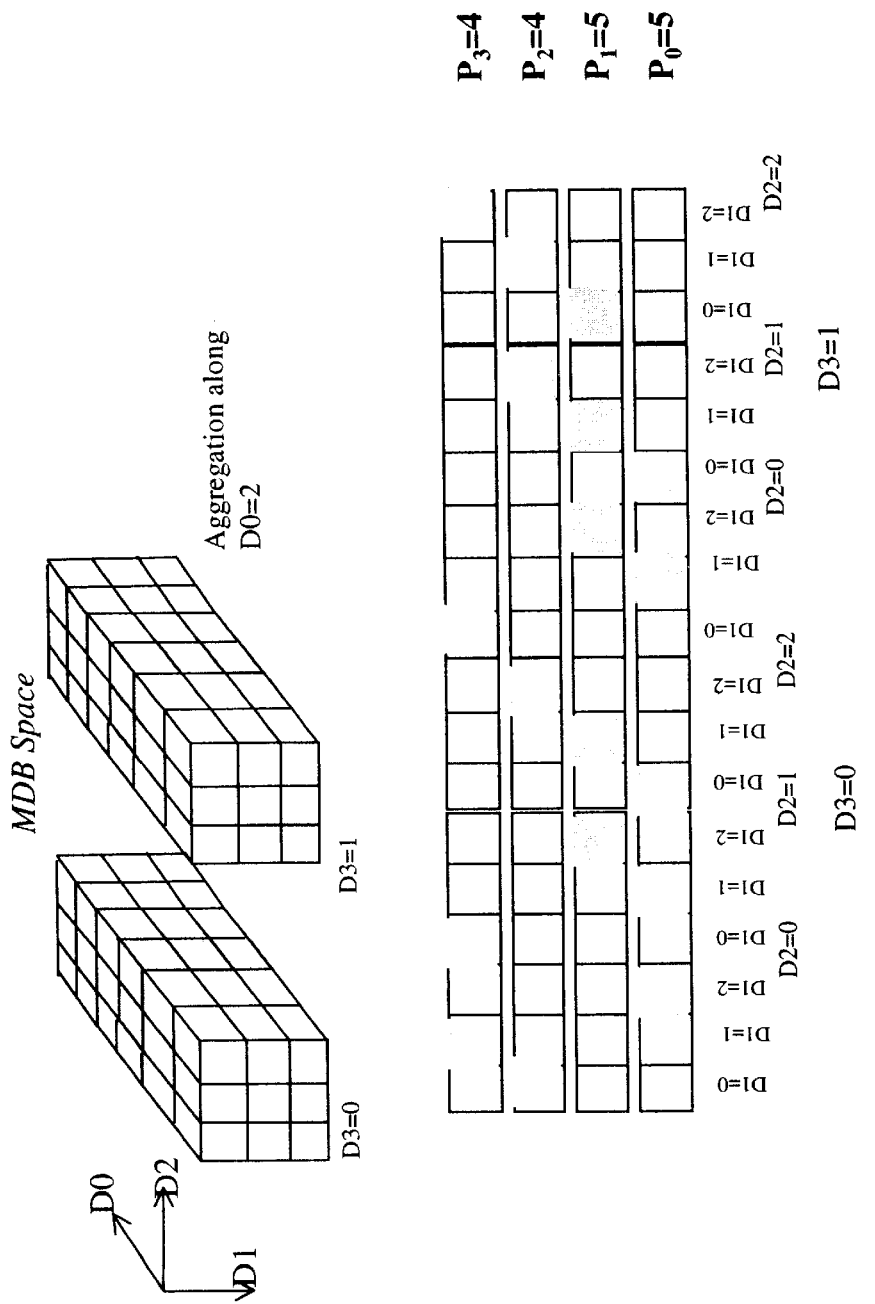
*Fig. 12B1*

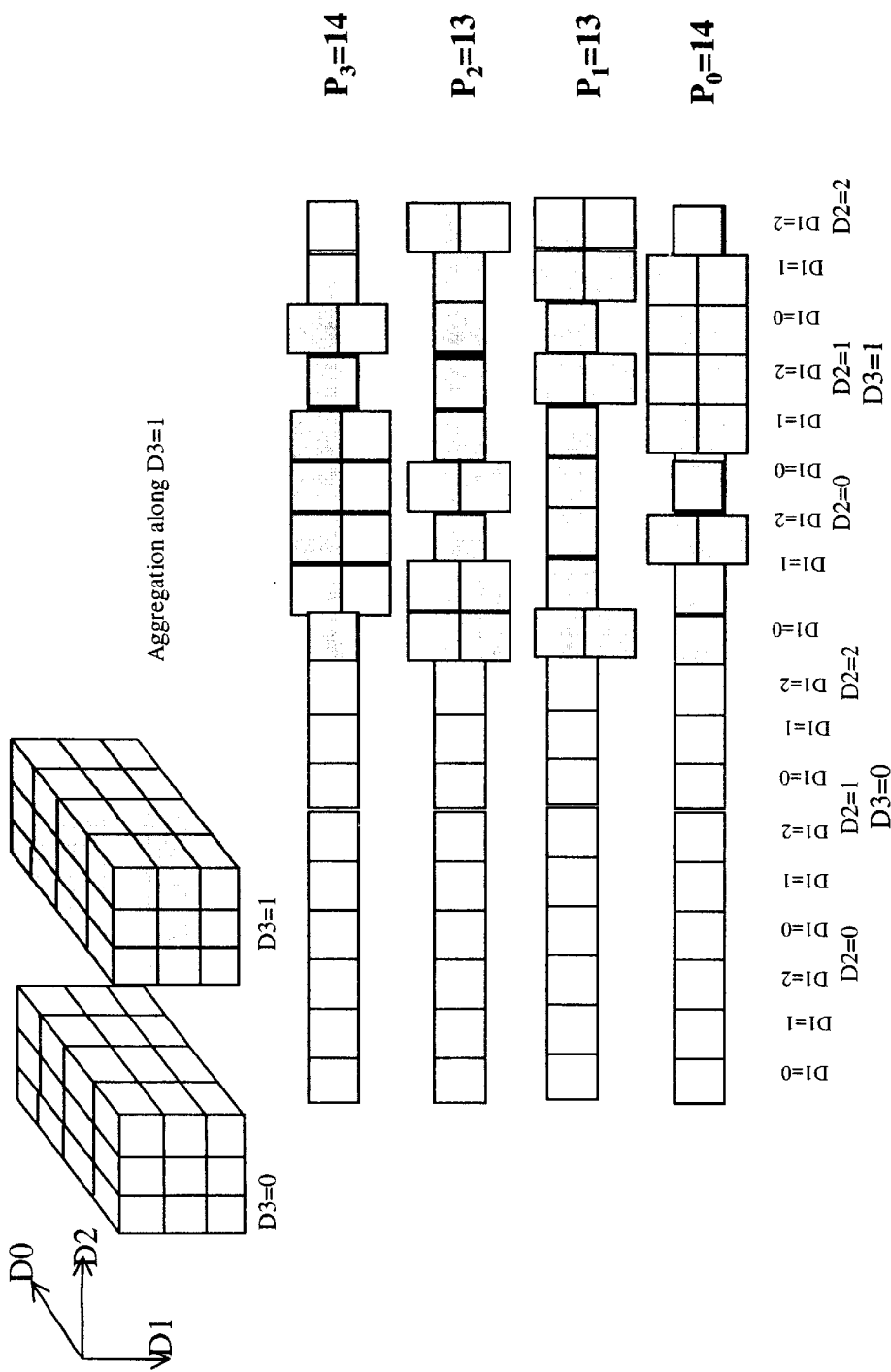
Fig. 12B2
Each processor is assigned the same number of data elements during aggregation along the D3 dimension within a 3-D MDB supported upon a parallel machine having 4 processors operating in accordance with the present invention.

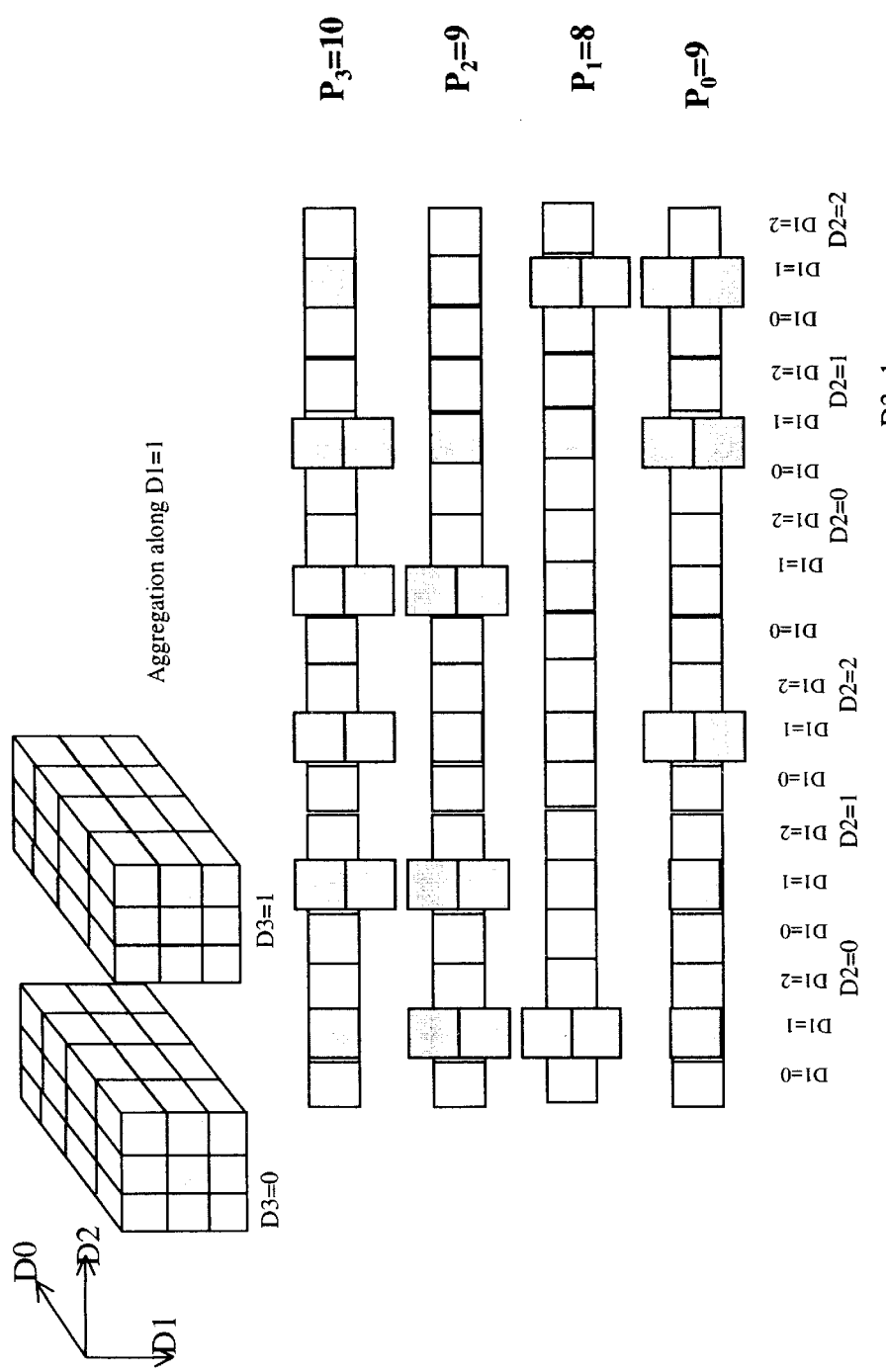
*Fig. 12B3*

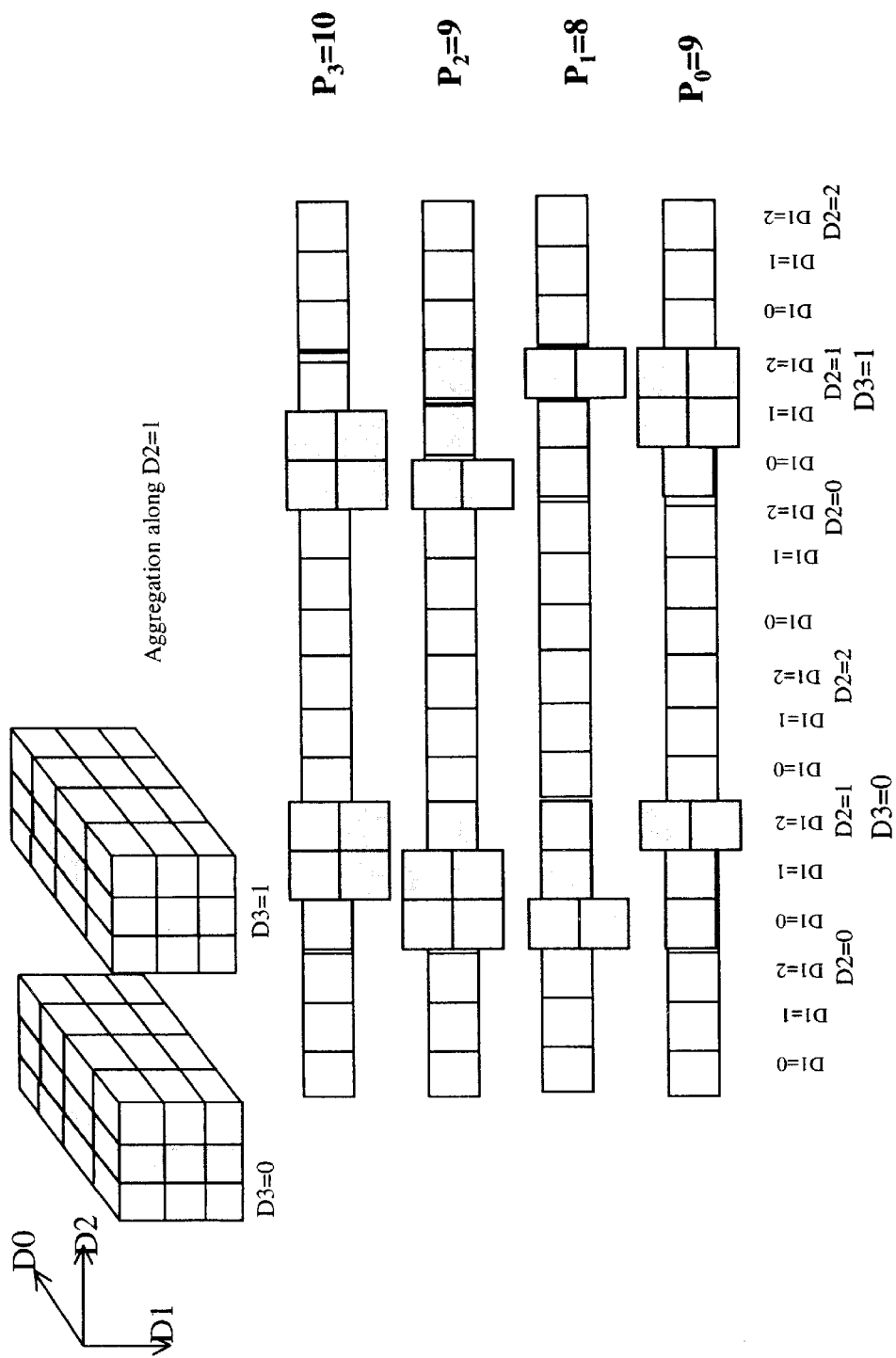
Fig. 12B4
Each processor is assigned the same number of data elements during aggregation along the D2 dimension within a 3-D MDB supported upon a parallel machine having 4 processors operating in accordance with the present invention.

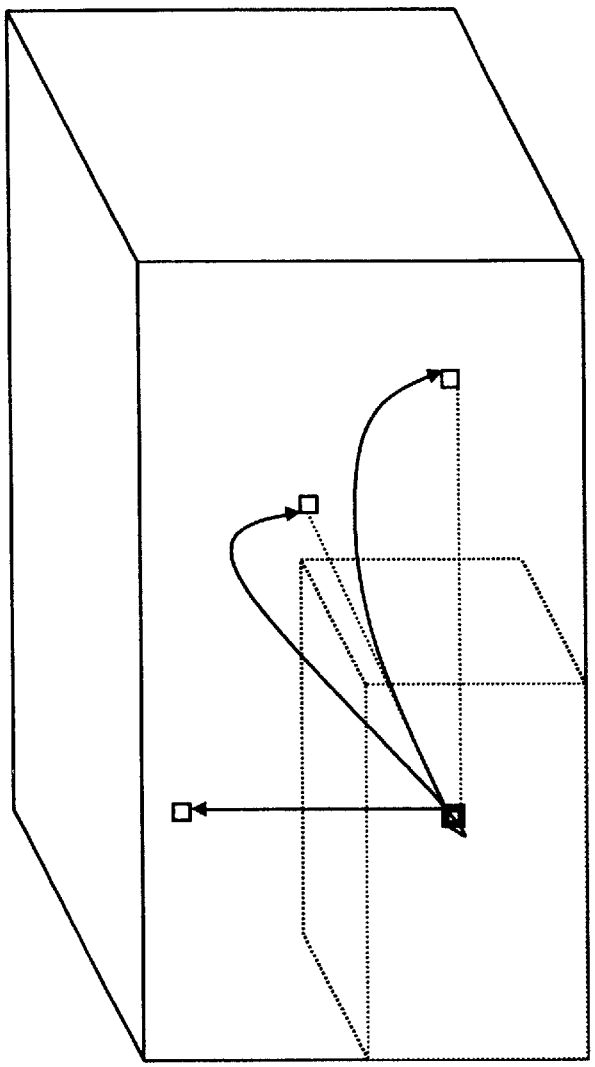
Fig. 12C1

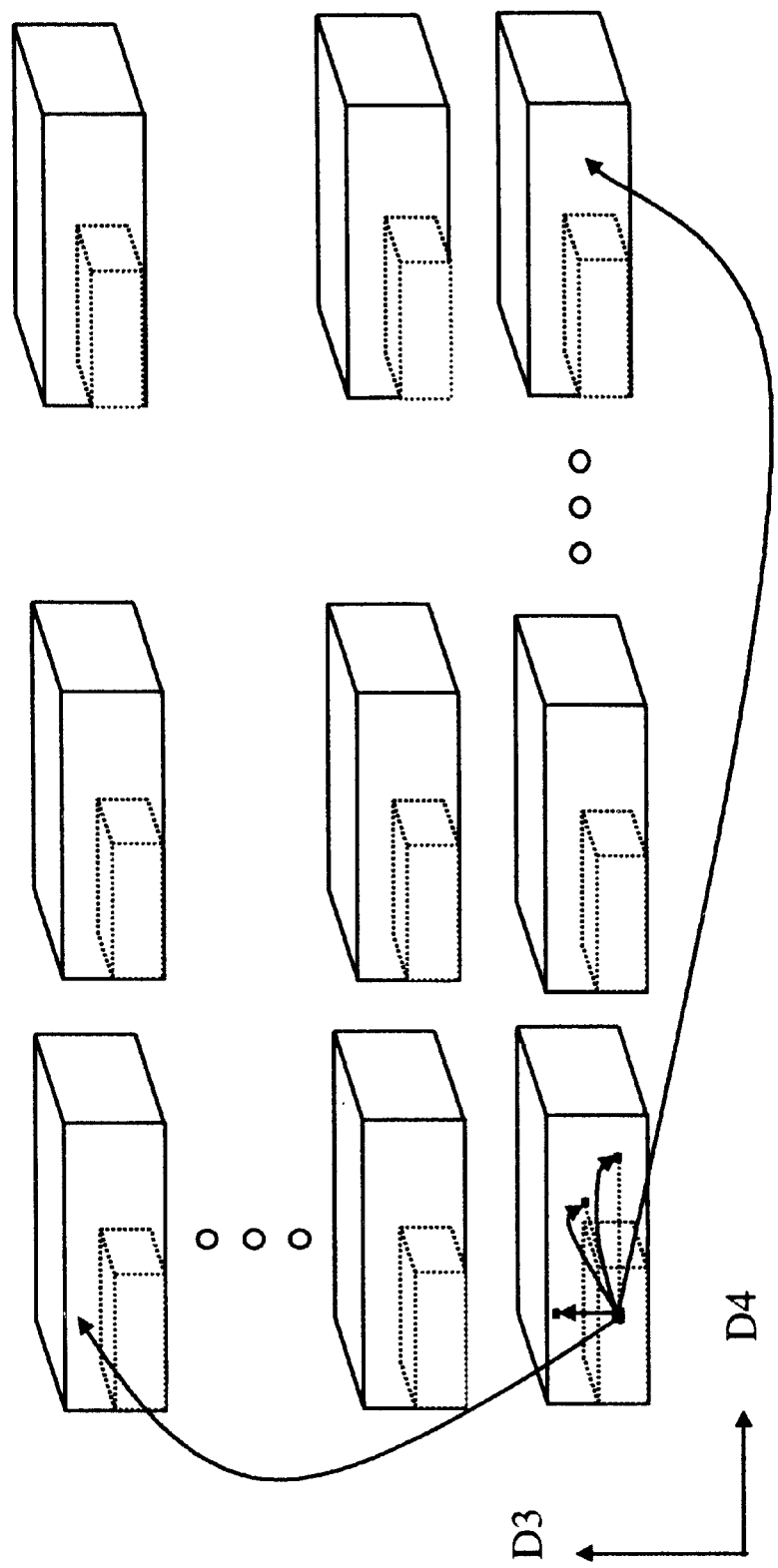
Fig. 12C2

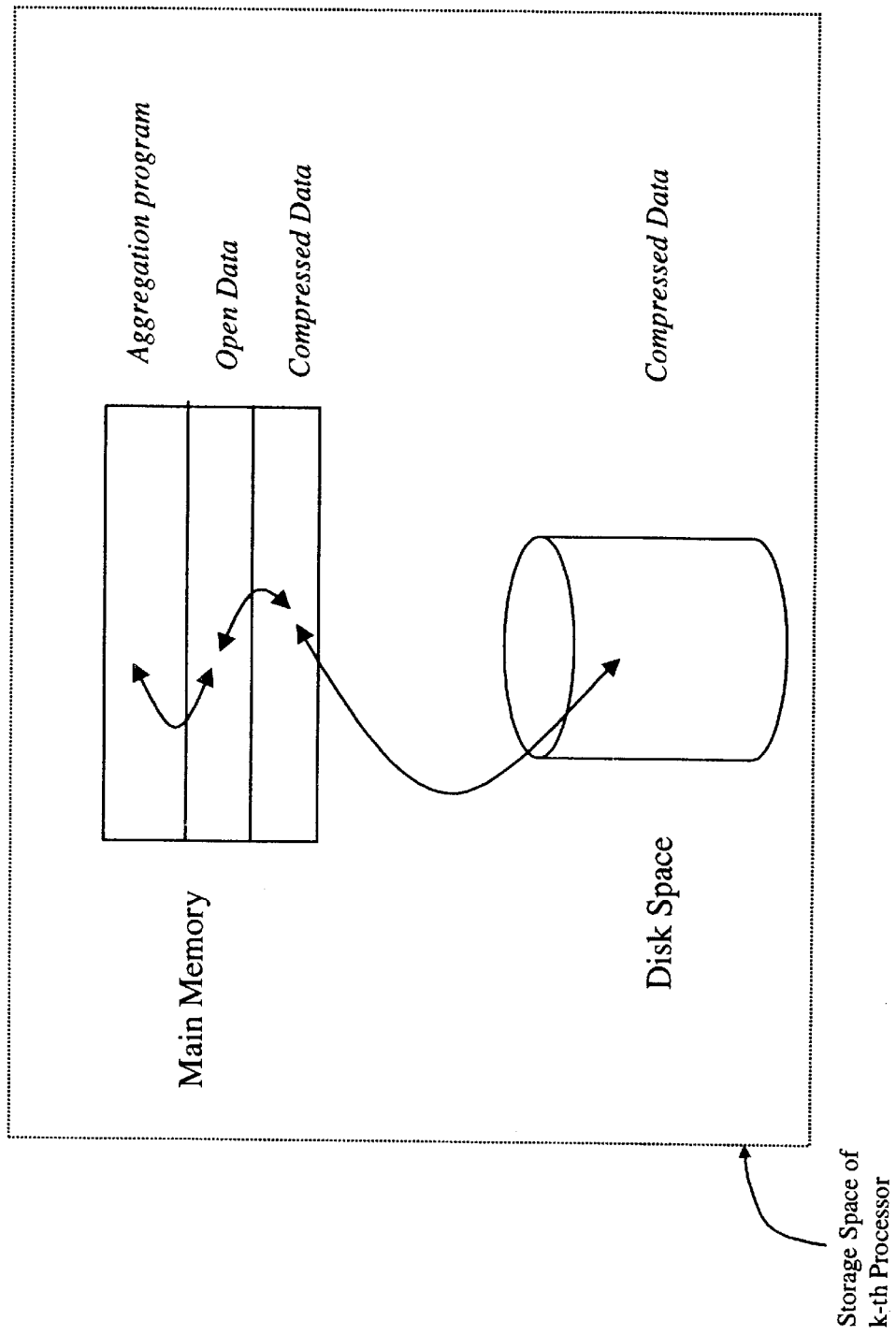
Fig. 12C3

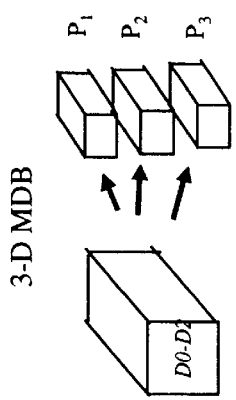
Fig. 14B1
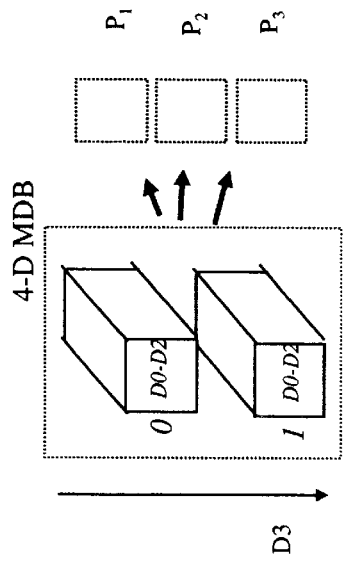
Fig. 14B2
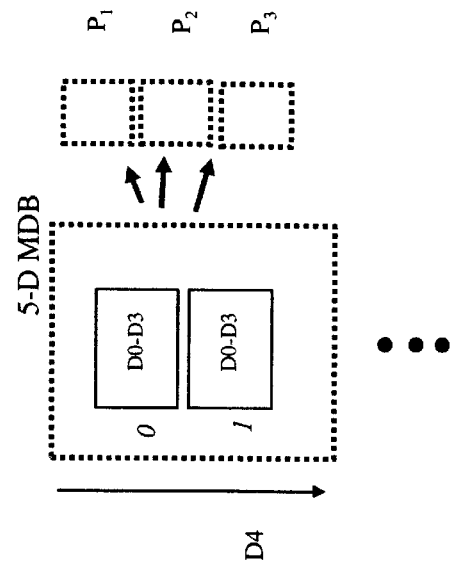
Fig. 14B3

METHOD OF AND SYSTEM FOR MANAGING MULTI-DIMENSIONAL DATABASES USING MODULAR-ARITHMETIC BASED ADDRESS DATA MAPPING PROCESSES ON INTEGER-ENCODED BUSINESS DIMENSIONS

BACKGROUND OF THE INVENTION

1. Field of Invention

The present invention relates to an improved method and a system for managing data elements in a multi-dimensional database (MDB) supported upon a parallel computing platform using improved address data mapping (i.e. translation) processes, and more particularly, to an improved method of and a system for managing data elements within a MDB during on-line analytical processing (OLAP) operations.

2. Brief Description of the State of the Art

The ability to act quickly and decisively in today s increasingly competitive marketplace is critical to the success of organizations. The volume of information that is available to corporations is rapidly increasing and frequently overwhelming. Those organizations that will effectively and efficiently manage these tremendous volumes of data, and use the information to make business decisions, will realize a significant competitive advantage in the marketplace.

Data warehousing, the creation of an enterprise-wide data store, is the first step towards managing these volumes of data. The Data Warehouse is becoming an integral part of many information delivery systems because it provides a single, central location where a reconciled version of data extracted from a wide variety of operational systems is stored. Over the last few years, improvements in price, performance, scalability, and robustness of open computing systems have made data warehousing a central component of Information Technology CIT strategies. Details on methods of data integration and constructing data warehouses can be found in the white paper entitled Data Integration: The Warehouse Foundation by Louis Rollleigh and Joe Thomas, published at http://www.acxiom.com/whitepapers/wp-11.asp.

Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. OLAP systems allow knowledge workers to intuitively, quickly, and flexibly manipulate operational data using familiar business terms, in order to provide analytical insight into a particular problem or line of inquiry. For example, by using an OLAP system, decision makers can slice and dice information along a customer (or business) dimension, and view business metrics by product and through time. Reports can be defined from multiple perspectives that provide a high-level or detailed view of the performance of any aspect of the business. Decision makers can navigate throughout their database by drilling down on a report to view elements at finer levels of detail, or by pivoting to view reports from different perspectives. To enable such full-functioned business analyses, OLAP systems need to (1) support sophisticated analyses, (2) scale to large numbers of dimensions, and (3) support analyses against large atomic data sets. These three key requirements are discussed further below.

Decision makers use key performance metrics to evaluate the operations within their domain, and OLAP systems need to be capable of delivering these metrics in a user customizable format. These metrics may be obtained from the transactional databases precalculated and stored in the database, or generated on demand during the query process. Commonly used metrics include:

(1) Multidimensional Ratios (e.g. Percent to Total)

Show me the contribution to weekly sales and category profit made by all items sold in the Northwest stores between July 1 and July 14.

(2) Comparisons (e.g. Actual vs. Plan, This Period vs. Last Period)

Show me the sales to plan percentage variation for this year and compare it to that of the previous year to identify planning discrepancies.

(3) Ranking and Statistical Profiles (e.g. Top N/Bottom N, 70/30, Quartiles)

Show me sales, profit and average call volume per day for my 20 most profitable salespeople, who are in the top 30% of the worldwide sales.

(4) Custom Consolidations (e.g. Financial Consolidations, Market Segments, Ad Hoc Groups)

Show me an abbreviated income statement by quarter for the last two quarters for my Western Region operations.

Knowledge workers analyze data from a number of different business perspectives or dimensions. As used hereinafter, a dimension is any element or hierarchical combination of elements in a data model that can be displayed orthogonally with respect to other combinations of elements in the data model. For example, if a report lists sales by week, promotion, store, and department, then the report would be a slice of data taken from a four-dimensional data model.

Target marketing and market segmentation applications involve extracting highly qualified result sets from large volumes of data. For example, a direct marketing organization might want to generate a targeted mailing list based on dozens of characteristics, including purchase frequency, purchase recency, size of the last purchase, past buying trends, customer location, age of customer, and gender of customer. These applications rapidly increase the dimensionality requirements for analysis.

The number of dimensions in OLAP systems range from a few orthogonal dimensions to hundreds of orthogonal dimensions. Orthogonal dimensions in an exemplary OLAP application might include Geography, Time, and Products.

Atomic data refers to the lowest level of data granularity required for effective decision making. In the case of a retail merchandising manager, "atomic data" may refer to information by store, by day, and by item. For a banker, atomic data may be information by account by transaction by branch. Most organizations implementing OLAP systems find themselves needing systems that can scale to tens, hundreds, and even thousands of gigabytes of atomic information.

As OLAP systems become more pervasive and are used by the majority of the enterprise, more data over longer time frames will be included in the data store (i.e. data warehouse), and the size of the database will increase by at least an order of magnitude. Thus, OLAP systems need to be able to scale from present to near-future volumes of data.

In general, OLAP systems need to (1) support the complex analysis requirements of decision-makers, (2) analyze the data from a number of different perspectives (i.e. business dimensions), and (3) support complex analyses against large input (atomic-level) data sets from a Data Warehouse maintained by the organization using a relational database management system (RDBMS).

Vendors of OLAP systems classify OLAP Systems as either Relational OLAP (ROLAP) or Multidimensional OLAP (MOLAP) based on the underlying architecture thereof Thus, there are two basic architectures for On-Line Analytical Processing systems: The ROLAP Architecture, and the MOLAP architecture.

Overview of the Relational OLAP Architecture

The Relational OLAP (ROLAP) system accesses data stored in a Data Warehouse to provide OLAP analyses. The premise of ROLAP is that OLAP capabilities are best provided directly against the relational database, i.e. the Data Warehouse. An overview of the ROLAP architecture is provided in FIG. 1A.

The ROLAP architecture was invented to enable direct access of data from Data Warehouses, and therefore support optimization techniques to meet batch window requirements and provide fast response times. Typically, these optimization techniques typically include application-level table partitioning, pre-aggregate inferencing, denormalization support, and the joining of multiple fact tables.

As shown in FIG. 1A, a typical prior art ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses.

As shown in FIG. 1A, after the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transform the requests into SQL execution plans. The SQL execution plans are submitted to the relational database for processing, the relational query results are cross-tabulated, and a multidimensional result data set is returned to the end user. ROLAP is a fully dynamic architecture capable of utilizing precalculated results when they are available, or dynamically generating results from atomic information when necessary.

Overview of MOLAP Architecture

Multidimensional OLAP (MOLAP) systems utilize a proprietary multidimensional database (MDB) to provide OLAP analyses. The main premise of this architecture is that data must be stored multidimensionally to be accessed and viewed multi-dimensionally.

As shown in FIG. 1B, a typical prior art MOLAP system has a two-tier or layer client/server architecture. In this architecture, the MDB serves as both the database layer and the application logic layer. In the database layer, the MDB system is responsible for all data storage, access, and retrieval processes. In the application logic layer, the MDB is responsible for the execution of all OLAP requests. The presentation layer integrates with the application logic layer and provides an interface, through which the end users view and request OLAP analyses on their client machines which may be web-enabled through the infrastructure of the Internet. The client/server architecture of a MOLAP system allows multiple users to access the same multidimensional database (MDB).

As shown in FIG. 2A, information (i.e. basic data) from a variety of operational systems within an enterprise, comprising the Data Warehouse, is loaded into a prior art multidimensional database (MDB) through a series of batch routines. The Express™ server by the Oracle Corporation is exemplary of a popular server can be used to carry out the data loading process in prior art MOLAP systems. As shown in FIG. 2B an exemplary 3-D MDB is schematically depicted, showing geography, time and products as the "dimensions" of the database. The multidimensional data of the MDB is organized in an array structure, as shown in FIG. 2C. Physically, the Express™ server stores data in pages (or records) of an information file. Pages contain 512, or 2048, or 4096 bytes of data, depending on the platform and release of the Express™ server. In order to look up the physical record address from the database file recorded on a disk or other mass storage device, the Express™ server generates a data structure referred to as a Page Allocation Table (PAT). As shown in FIG. 2D, the PAT tells the Express server the physical record number that contains the page of data. Typically, the PAT is organized in pages. The simplest way to access a data element in the MDB is by calculating the "offset" using the additions and multiplications expressed by a simple formula:

Offset=Months+Product*(#of__Months)+City*(#of Months*#of__Products)

During an OLAP session, the response time of a multidimensional query on a prior art MDB depends on how many cells in the MDB have to be added on the fly. As the number of dimensions in the MDB increases linearly, the number of the cells in the MDB increases exponentially. However, it is known that the majority of multidimensional queries deal with summarized high level data. Thus, as shown in FIGS. 3A and 3B, once the atomic data (i.e. basic data) has been loaded into the MDB, the general approach is to perform a series of calculations in batch in order to aggregate (i.e. pre-aggregate) the data elements along the orthogonal dimensions of the MDB and fill the array structures thereof.

For example, revenue figures for all retail stores in a particular state (i.e. New York) would be added together to fill the state level cells in the MDB. After the array structure in the database has been filled, integer-based indices are created and hashing algorithms are used to improve query access times. Pre-aggregation of dimension DO is always performed along the cross-section of the MDB along the DO dimension.

As shown in FIG. 3C3, the primarily loaded data in the MDB is organized at its lowest dimensional hierarchy. As shown in FIGS. 3C1 and 3C3, the results of the pre-aggregations are stored in the neighboring parts of the MDB. As shown in FIG. 3C2, along the TIME dimension, weeks are the aggregation results of days, months are the aggregation results of weeks, and quarters are the aggregation results of months. While not shown in the figures, along the GEOGRAPHY dimension, states are the aggregation results of cities, countries are the aggregation results of states, and continents are the aggregation results of countries. By pre-aggregating (i.e. consolidating or compiling) all logical subtotals and totals along all dimensions of the MDB, it is possible to carry out realtime MOLAP operations using a multidimensional database (MDB) containing both basic (i.e. atomic) and pre-aggregated data.

Once this compilation process has been completed, the MDB is ready for use. Users request OLAP reports by submitting queries through the OLAP Application interface (e.g. using web-enabled client machines), and the application logic layer responds to the submitted queries by retrieving the stored data from the MDB for display on the client machine. Each data retrieval operation carried out on the MDB involves searching through the Page Allocation Tables (e.g. search trees) maintained therefor in order to determine the addresses of the data elements needed to answer the query. Because the Page Allocation Tables (PATs) typically contain billions of entries, paging of the tables from mass storage memory is often required as schematically depicted in FIG. 4. This increases the time required to search the Page Allocation Tables, find the n-dimensional Cartesian addresses for the sought after data elements, convert the n-dimensional Cartesian addresses into physical record addresses, and physically access the corresponding data records stored within the storage volumes of the MDB.

Thus, each time the basic or atomic data in the MDB requires updating in any significant manner, for any reason, the MOLAP system must carry out computationally intensive data compilation operations in order to precompile (i.e. pre-aggregate) data within the MDB. The graphs plotted in FIG. 5 clearly indicate the computational demands that are created when searching an MDB during an OLAP session, where answers to queries are presented to the MOLAP system, and answers thereto are solicited often under real-time constraints. However, prior art MOLAP systems have limited capabilities to dynamically create data aggregations or to calculate business metrics that have not been precalculated and stored in the MDB. Thus, there is a great need in the art for an improved way of and means for accessing data elements within a multi-dimensional database (MDB) containing precompiled or pre-aggregated data and supported on a parallel computing platform during OLAP or like operations, while avoiding the shortcomings and drawbacks of prior art systems and methodologies.

SUMMARY AND OBJECTS OF PRESENT INVENTION

In view of the computational demands of such prior art MOLAP systems, Applicants have recognized that the performance of such systems might be significantly improved, and thus made more competitive with and superior to prior art ROLAP systems, if parallel processing techniques are used to implement prior art MOLAP processes.

In FIG. 6, Applicants disclose a novel type of parallel computing machine (i.e. platform) 1 for implementing MOLAP systems. As shown therein, the multi-dimensional database (MDB) 2 is supported on the parallel machine using a plurality of processors 3 denoted $P_0$, $P_1$, $P_{p-1}$, each having DRAM 4 for address data storage during system operation, and one or more storage volumes 5 for storing application data and address data. An OLAP server 6 (e.g. the Express™ Server from the Oracle Corporation) is provided between the Data Warehouse (e.g. RDBMS) 7 and the parallel machine 2. The processor(s) 8 within the OLAP server 6, denoted by P(s), and DRAM 9 and local storage volumes 10 associated therewith, are in communication with the array of processors 3 in the parallel computing machine 2. Also, as shown, each processor 3 in the parallel computing machine 2 has direct access to the mass storage volumes within the Data Warehouse 7. For illustration purposes, the processor(s) used in the Data Warehouse 7 are indicated by reference numeral 11, whereas its DRAM is indicated by reference numeral 12, and its mass storage volumes are indicated by reference numeral 13.

In principal, the use of parallel processing machines as taught by Applicants in FIG. 6 should enable quick and direct access to an array of answers to the submitted queries, as well as speed up the pre-aggregation process and the execution of multidimensional queries and drill-down processes. Also, effective parallel processing can be expected only by ensuring that the data is evenly distributed data among the processors in the parallel computing system, and that all loads are balanced.

In an effort to apply parallel processing techniques to prior art MOLAP systems, Applicants have developed two novel methods of data element address assignment (i.e. address data translation), each based on partitioning the array of multidimensional data. The first method seeks to partition a conventional array of data by dividing it by the lowest dimension of the corresponding MDB, as schematically illustrated in FIG. 7A. The second method seeks to partition a multidimensional data by dividing it by the highest dimension of the corresponding MDB, as schematically illustrated in 7B.

As indicated in FIG. 7C, the first method of data element address assignment attempts to carry out data address assignment using a method of partitioning a multidimensional data by dividing it by the lowest dimension of the corresponding MDB. As illustrated in FIG. 7A, this method results in unbalanced data processing among the processors of the parallel computing machine, and in sequential, as opposed to parallel, access to data.

As indicated in FIG. 7C, the second method of data element assignment attempts to carry out data address assignment using a method of partitioning a multidimensional data by dividing according the highest dimension of the corresponding MDB. As illustrated in FIG. 7B, this method results in unbalanced data processing among the processors of the parallel computing machine, and in sequential access to data.

Surprisingly, Applicants have discovered that implementing a MOLAP system on a parallel computing platform, using the data structure of conventional Page Allocation Tables, does not provide increases in system performance (e.g. decreased access/search time) which might be expected when parallelizing a serial computing application.

Accordingly, it is a further object of the present invention to provide an improved method of and apparatus for accessing data elements within a multidimensional database (MDB) using a parallel computing platform, achieving a significant increase in system performance (e.g. deceased access/search time) using parallel computing techniques.

Another object of the present invention is to provide such apparatus in the form of an improved MOLAP system, wherein the MDB contains precompiled or pre-aggregated data and parallel data loading operations are carried out between the Data Warehouse and the MDB of the system using a novel modular arithmetic based data element address assignment scheme which involves mapping (i) integer-encoded MDB dimensions associated with the raw data elements accessed from the Data Warehouse, into (ii) integer-encoded data storage addresses within the storage volumes associated with the MDB.

Another object of the present invention is to provide such apparatus in the form of an improved MOLAP system, wherein parallel data aggregation operations are carried out within the MDB of the system using a novel modular arithmetic based data element address assignment scheme which involves mapping (i) integer-encoded MDB dimensions associated with the raw or previously pre-aggregated data elements to be stored within the MDB, into (ii) integer-encoded data storage addresses within the storage volumes thereof at which the pre-aggregated data elements are to be stored.

Another object of the present invention is to provide such apparatus in the form of an improved MOLAP system, wherein OLAP operations are carried out within the MDB of the system using a novel modular arithmetic based data element address assignment scheme which involves mapping (i) integer-encoded MDB dimensions associated with preaggregated data elements to be accessed from the MDB, into (ii) integer-encoded data storage addresses within the storage volumes thereof, from which the pre-aggregated data elements are to be accessed.

Another object of the present invention is to provide such an improved MOLAP system, wherein data processing tasks are evenly distributed among processors on the parallel computing platform of the system.

Another object of the present invention is to provide such an improved MOLAP system, wherein data elements within the MDB of the system are evenly distributed among the processors on the parallel computing platform thereof.

Another object of the present invention is to provide such an improved MOLAP system, wherein each processor on the parallel computing platform handles data elements assigned thereto during data address assignment operations carried out during parallel data loading operations and parallel data aggregation operations within the system.

Another object of the present invention is to provide such an improved MOLAP system, wherein there is no need to exchange data among processors on the parallel computing platform.

Another object of the present invention is to provide such an improved MOLAP system, wherein the need for inter-processor communication among the parallel processors is minimized.

Another object of the present invention is to provide an improved MOLAP method, wherein parallel data loading operations are carried out between the Data Warehouse and MDB of the system using a data element address assignment scheme that employs mapping of MDB dimensions using modular arithmetic.

Another object of the present invention is to provide such an improved MOLAP method, wherein parallel data aggregation operations are carried out between the Data Warehouse and MDB of the system using a data element address assignment scheme that employs mapping of MDB dimensions using modular arithmetic.

Another object of the present invention is to provide such an improved MOLAP method, wherein data processing tasks are evenly distributed among processors on the parallel computing platform of the system.

Another object of the present invention is to provide such an improved MOLAP method, wherein data elements within the MDB of the system are evenly distributed among the processors on the parallel computing platform thereof.

Another object of the present invention is to provide such an improved MOLAP method, wherein each processor on the parallel computing platform handles data elements assigned thereto during data address assignment operations carried out during parallel data loading operations and parallel data aggregation operations within the system.

Another object of the present invention is to provide such an improved MOLAP method, wherein there is no need to exchange data among processors on the parallel computing platform.

Another object of the present invention is to provide such an improved MOLAP method, wherein the need for inter-processor communication among the parallel processors is minimized.

Another object of the present invention is to provide a new method of generating an information directory or index for a multidimensional database (MDB) used in a MOLAP system. Another object of the present invention is to provide such a method of generating an information directory or index for an MDB, wherein data element addresses to data storage elements therewithin are generated using (i) modular arithmetic functions, (ii) dimensions of the MDB and its dimensional hierarchy, and (iii) data variables from the relational database management system (RDBMS) of the Data Warehouse associated with the MDB.

Another object of the present invention is to provide an improved decision support system which allows knowledge workers to intuitively, quickly, and flexibly manipulate operational data using familiar business terms in order to provide analytical insight into a business domain of interest.

Another object of the present invention is to provide a novel method of using a MDB to support OLAP systems.

Another object of the present invention is to provide an improved system and method of searching and updating a MDB containing an index of information resources locators (URLs) on the Internet, referred to as an MBD-based URL-Index or Directory.

Another object of the present invention is to provide such an improved system and method of searching and updating a MDB-based URL-Index or Directory, wherein data storage, retrieval, updating and shifting operations are carried out within the MDB of the system using a novel modular arithmetic based data element address assignment scheme which involves mapping (i) integer-encoded MDB dimensions associated with data elements to be stored in, retrieved from or shifted within the MDB, into (ii) integer-encoded data storage addresses within the storage volumes thereof.

Another object of the present invention to provide a novel method of data mapping and storage for use in the parallel access of multidimensional data bases, as well as in parallel data loading and aggregation operations, and on-the-fly multidimensional queries, while ensuring balanced processing and minimizing interprocessor communication among a plurality of processors.

Another object of the present invention is to provide a method of decomposing, or partitioning, an n-dimensional database into p modules, where p represents the number of processors (i.e. processing module) in the multiprocessing array, $D_0, D_1, D_{n-1}$ represent n dimensions, and k represents the k-th out of p processing modules, is based on the following address data translation (i.e. mapping) formula:

$$k=(D_{n-1}+D_1+D_0) \bmod p$$

Another object of the present invention is to provide such as method, wherein each data element is specified by index k, and the entire data domain is decomposed and assigned to the Processor (Memory) Space of p processing modules.

Another object of the present invention is to provide a novel MDB-based Internet URL Directory system for supporting on-line information searching operations by Web-enabled client machines.

Another object of the present invention is to provide a novel personalized electronic commerce (i.e. on-line) shopping system, in which consumer shopping profile information is collected on individual consumers during e-commerce and other transactions, stored in an MBD for quick access and use in creating Web-enabled personalized shopping environments (e.g. personalized Web-stores) in a real-time manner which reflect the interests, tastes, desires and/or expectations of the individual customers engaged in online shopping activities supported by electronic-commerce servers over the Internet.

Another object of the present invention is to provide a novel MDB-based system for providing fast, affordable and easy access to customer intelligence, enabling companies to more effectively market products and services over the Internet.

Another object of the present invention is to provide a novel MDB-based system that enables value-added services to customers running e-commerce enabled Web sites.

Another object of the present invention is to provide a novel MDB-based system that enables improved levels of strategic business analysis and data mining on the Internet.

Another object of the present invention is to provide a novel MDB-based system that enables a company to leverage strategic information on its customers and competitors by quickly uncovering hidden patterns and more accurately predicting customer behavior.

Another object of the present invention is to provide a novel MDB-based system that enables fast knowledge discovery and accurate predictive business modeling for applications such as database marketing, financial/risk analysis, fraud management, bioinformatics, return-on-investment (ROI) justification, business intelligence applications (e.g. Balanced Scorecard, Activity-Based Costing), customer relations management (CRM), enterprise information portals and the like.

Another object of the present invention is to provide a novel Internet-enabled MDB-based system for supporting real-time control of processes in response to complex states of information reflected in the MDB.

These and other object of the present invention will become apparent hereinafter and in the Claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIG. 3C1 is a schematic representation of an exemplary three-dimensional database used in a conventional MOLAP system of the prior art, showing that each data element contained therein is physically stored at a location in the recording media of the system which is specified by the dimensions (and subdimensions within the dimensional hierarchy) of the data variables which are assigned integer-based coordinates in the MDB, and also that data elements associated with the basic data loaded into the MDB are assigned lower integer coordinates in MDB Space than pre-aggregated data elements contained therewithin;

FIG. 3C2 is a schematic representation illustrating that a conventional hierarchy of the dimension of time typically contains the subdimensions days, weeks, months, quarters, etc. of the prior art;

FIG. 3C3 is a schematic representation showing how data elements having higher subdimensions of time in the MDB of the prior art are typically assigned increased integer addresses along the time dimension thereof;

FIG. 7C is a table setting forth the shortcomings and drawbacks associated with the data element address assignment methods of the present invention depicted in FIGS. 7A and 7B;

FIG. 9A1 illustrates the result of the process of data elements address assignment employed during the process of data element loading, between the MDB space of a 4-D MDB and the processor (memory) space of 4 processors (p=4) on a parallel machine operating in accordance with the present invention, showing uniform distribution of data elements of the MDB among processors;

FIG. 9A2 illustrates the result of the process of data element address assignment employed during the process of data element loading, between the MDB space of a 4-D MDB and the processor (memory) space of 3 processors (p=3) on a parallel machine operating in accordance with the present invention, showing uniform distribution of data elements of the MDB among processors;

FIG. 9A3 illustrates the result of the process of data elements address assignment during the process of data element loading, between the MDB space of a 4-D MDB and the processor (memory) space of 5 processors (p=5) on a parallel machine operating in accordance with the present invention, showing uniform distribution of data elements of the MDB among processors;

FIG. 9A4 illustrates the result of the process of data elements address assignment employed during the process of data element loading, between the MDB space of a 4-D MDB and the processor (memory) space of 6 processors (p=6) on a parallel machine operating in accordance with the present invention, showing uniform distribution of data elements of the MDB among processors;

FIG. 12B1 is a schematic representation depicting the parallel-based method of pre-aggregation according to the present invention, illustrating that each processor on a four-processor parallel computing machine of the type shown in FIG. 6, is assigned about the same number of data elements during data aggregation along the D0=2 subspace of a 3-D MDB supported thereupon;

FIG. 12B2 is a schematic representation depicting the parallel-based method of pre-aggregation according to the present invention, illustrating that each processor on a four-processor parallel computing machine, of the type shown in FIG. 6, is assigned about the same number of data elements during data aggregation along the D3=1 subspace of a 3-D MDB supported thereupon;

FIG. 12B3 is a schematic representation depicting the parallel-based method of preaggregation according to the present invention, illustrating that each processor on a four-processor parallel computing machine, of the type shown in FIG. 6 is assigned about the same number of data elements during data aggregation along the D1=1 subspace of a 3-D MDB supported thereupon;

FIG. 12B4 is a schematic representation depicting the parallel-based method of preaggregation according to the present invention, illustrating that each processor on a four-processor parallel computing machine, of the type shown in FIG. 6, is assigned about the same number of data elements during data aggregration along the D2=1 subspace of a 3-D MDB supported thereupon;

FIG. 12C1 is schematic representation depicting the aggregation procedure of the present invention carried out within a 3-dimensional MDB, where every single data element of the base data is summed up to the pre-aggregated data along each of the dimensions, and is handled only once during the entire data aggregation process of the present invention;

FIG. 12C2 is schematic representation of the aggregation procedure of the present invention carried out within a 5-dimensional MDB, where every single data element of the base data is summed up to the pre-aggregate data along each of the dimensions, and is handled only once in the entire aggregation process;

FIG. 12C3 is a schematic representation of the "Storage Space" of a single processor in the parallel operating machine of the present invention, illustrating, during the aggregation process, that most of the data is in a compressed state, in order to save memory/disk space and handling times, all the disk data is in a compressed state, that the data in the main memory is kept in two levels, namely compressed and open, that the aggregation program works directly on the open level, and that the open data, according to space availability, is compressed and moved to the Disk Space;

FIGS. 14A through 14B3 set forth a series of schematic representations illustrating that data element loading and aggregation processes of the present invention can be carried out with an MDB having any dimensionality or hierarchy of dimensionality, provided that each unit of dimensionality in the MDB is indexed using integer-based arithmetic;

DETAILED DESCRIPTION OF THE PREFERRED EMBODIMENTS OF THE PRESENT INVENTION

Figure 1A:
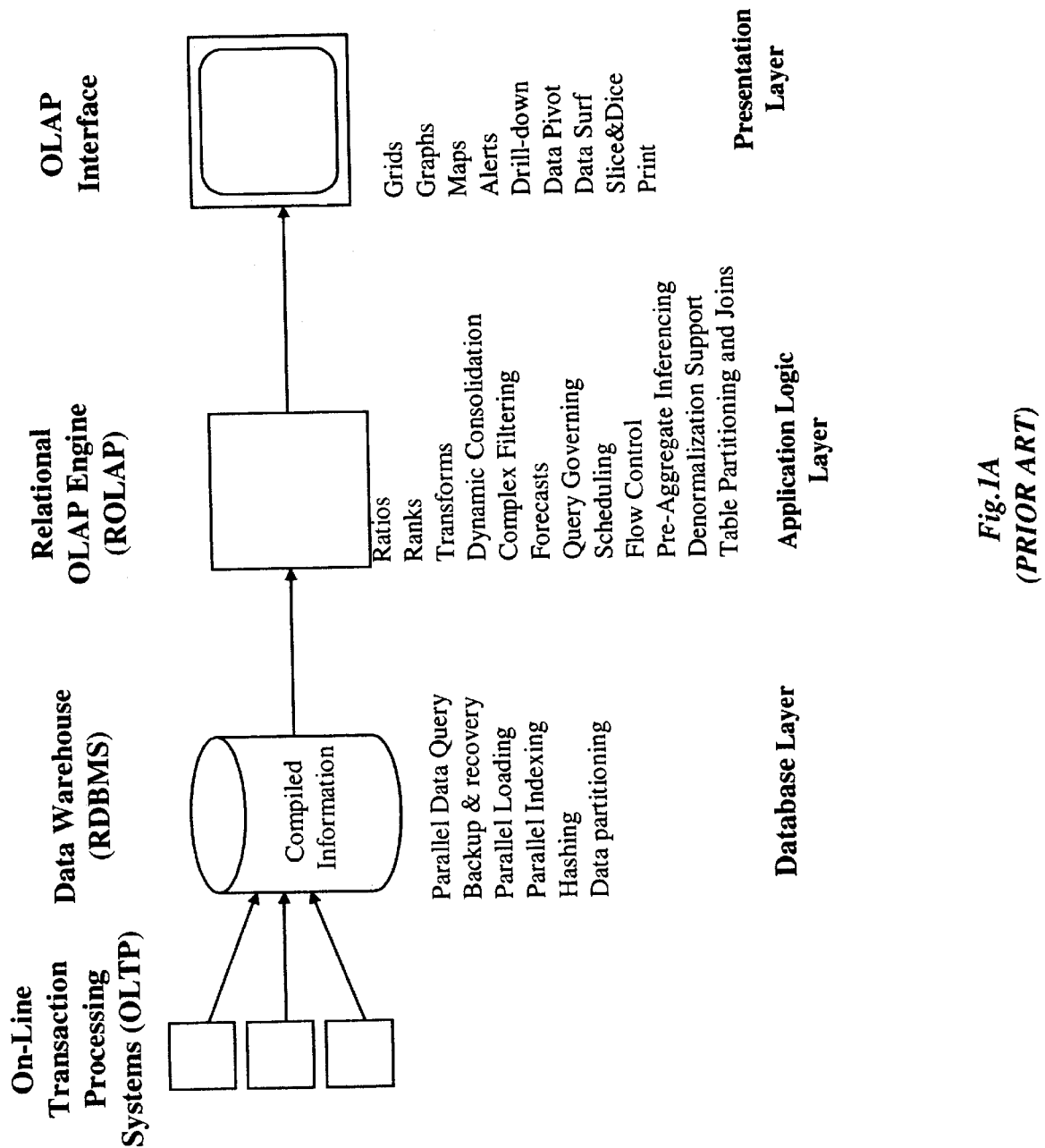
FIG. 1A is a schematic representation of an exemplary prior art relations on-line analytical processing (ROLAP) system comprising a three-tier or layer client/server architecture, wherein the first tier has a database layer utilizing relational databases (RDBMS) for data storage, access, and retrieval processes, the second tier has an application logic layer (i.e. the ROLAP engine) for executing the multidimensional reports from multiple users, and the third tier integrates the ROLAP engine with a variety of presentation layers, through which users perform OLAP analyses.

Referring now to FIGS. 6, and 8A through 14B3, the preferred embodiments of the method and system of the present invention will be now described in great detail hereinbelow, wherein like elements in the Drawings shall be indicated by like reference numerals.

In general, the address data mapping method and apparatus of the present invention can be employed in a wide range of applications, including MOLAP systems, Internet URL-directoriy systems, personalized on-line e-commerce shopping systems, Internet-based systems requiring real-time control of packet routing and/or switching, and the like. For purposes of illustration, initial focus will be accorded to improvements in MOLAP systems, in which knowledge workers are enabled to intuitively, quickly, and flexibly manipulate operational data within a MDB using familiar business terms in order to provide analytical insight into a business domain of interest. Thereafter, an improved system and method of accessing information on the WWW using an Internet-based URL directory will be disabled then, a personalized e-commerce shopping system will be described. Other applications will also be discussed.

Figure 6:
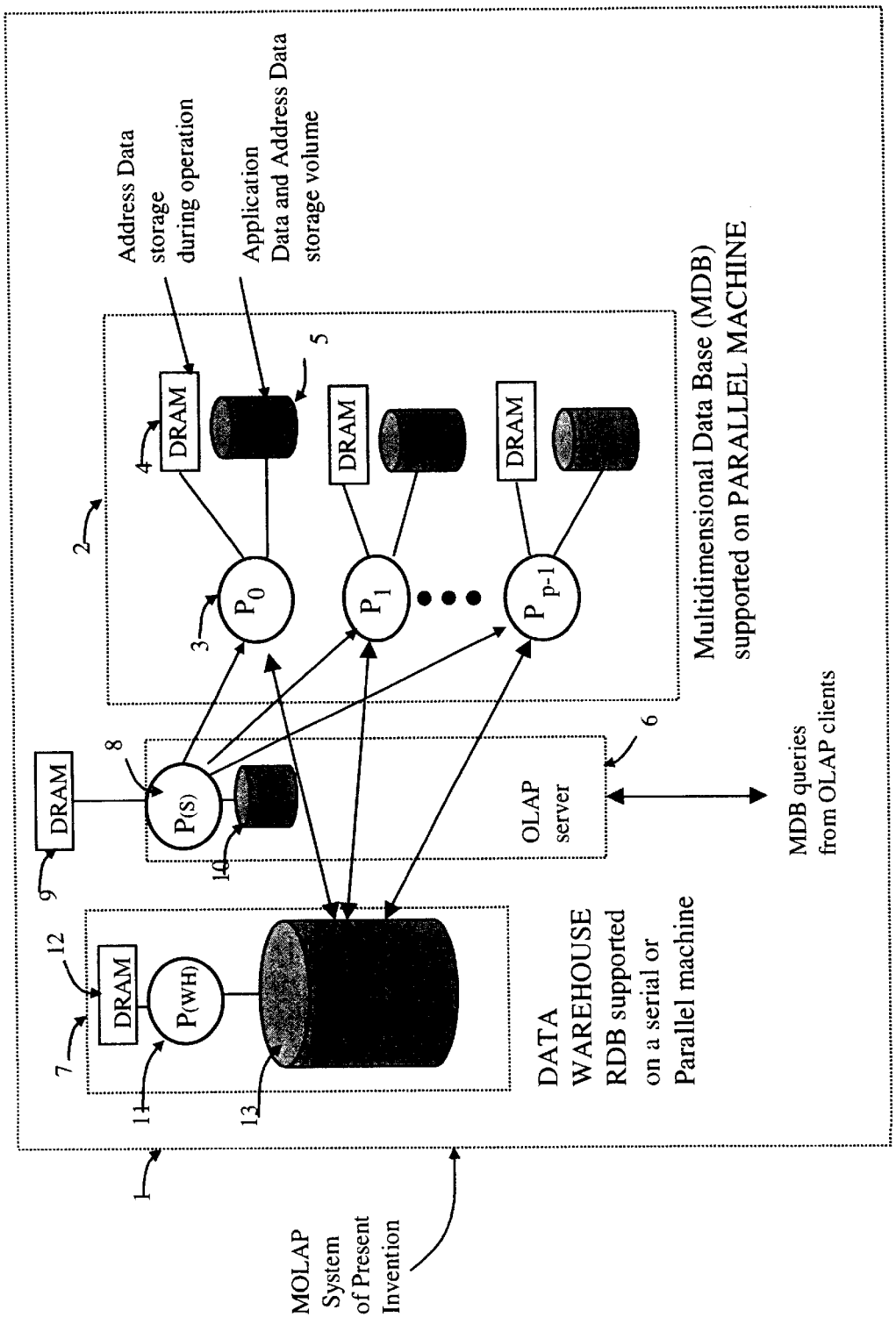
FIG. 6 is a schematic representation of a generalized MOLAP system according to the present invention, wherein a parallel computing machine is used to realize the MDB thereof using any one of several possible types of data element addressing methods of the present invention.
Figure 8A:
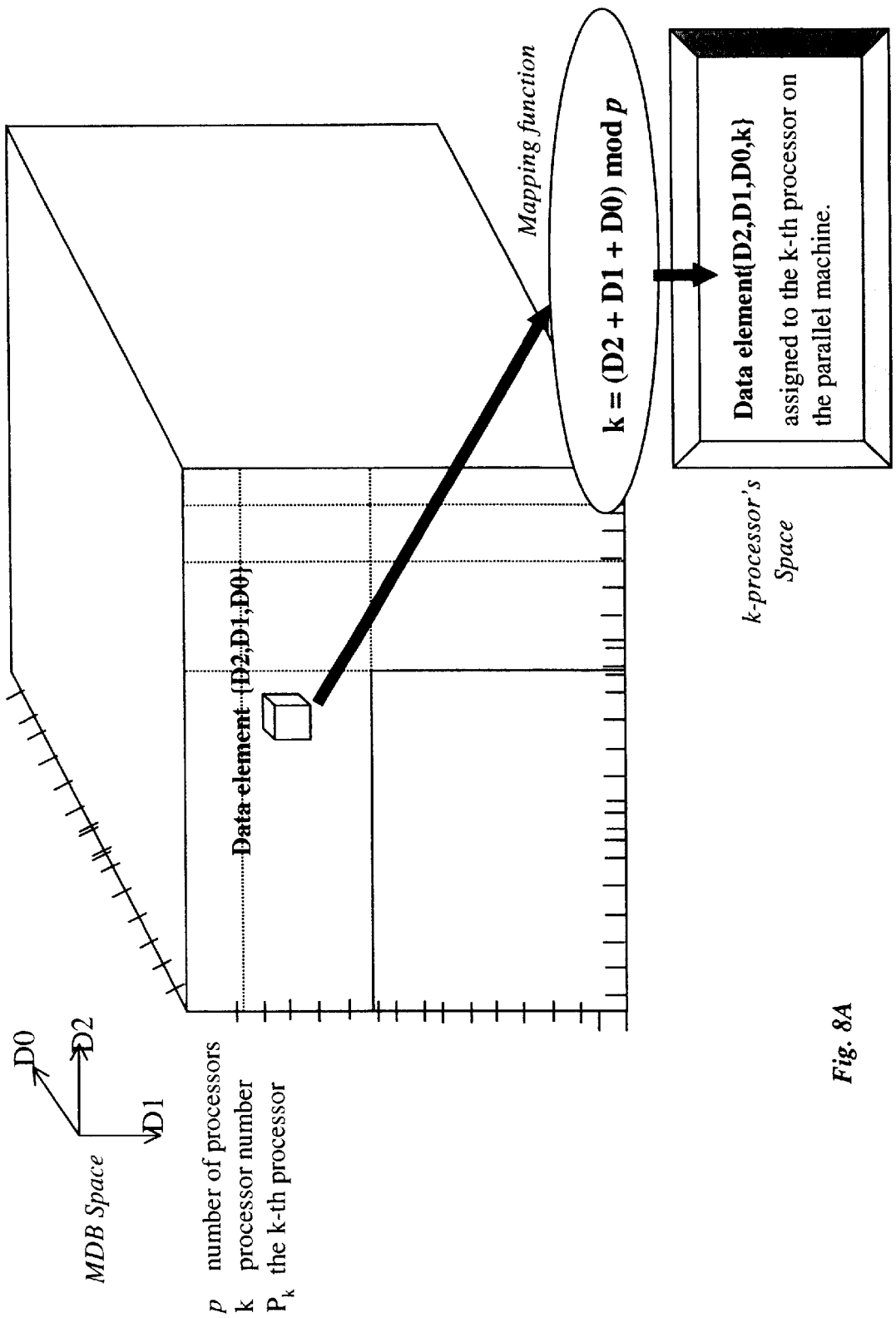
FIG. 8A is a schematic representation illustrating a third and preferred method of data element address assignment in accordance with the present invention, involving the generation of a set of (memory) page allocation tables (PATs) by mapping the dimensions of the MDB into physical storage addresses using modular integer-based arithmetic.

Method of Assigning Data Elements in the MDB to Specific Processors on a Parallel Computing Platform The MOLAP system and method of the preferred embodiment can be realized using the parallel computing machine shown in FIG. 6 and described above. As best illustrated in FIG. 8A, the data elements contained within the MDB of the MOLAP system are located within MDB Space at address locations specified by the integer-encoded dimensions of the data elements in the MDB. As schematically depicted in FIG. 8A, these data elements within the MDB are physically stored in the storage volumes of the MDB (in Processor Storage Space) at storage locations specified by integer-encoded addresses that are generated using the novel address data translation/mapping process of the present invention. To carry out each of the many operations associated with managing the MDB system of the present invention, the novel method of data element address assignment, schematically illustrated in FIG. 8A, is used within the MOLAP system.

Figure 8B:
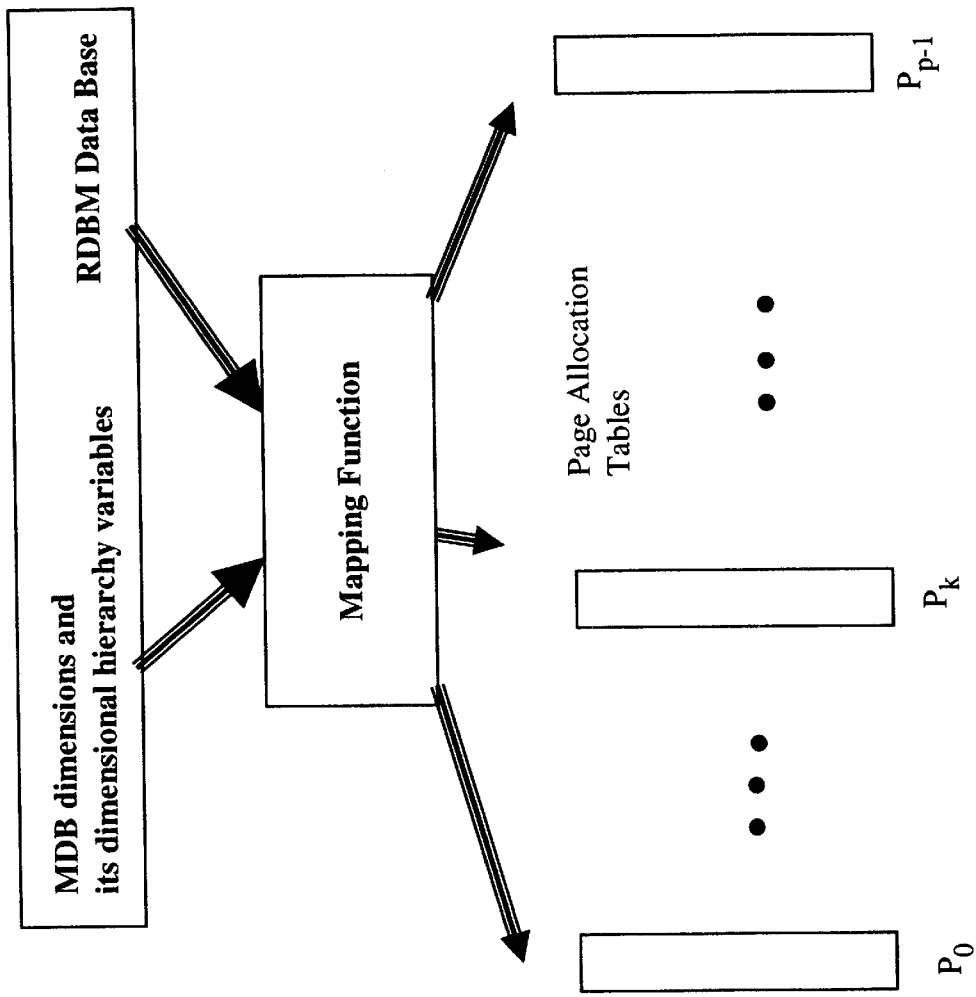
FIG. 8B is a schematic representation of the method of FIG. 8A, indicating that the inputs to the mapping (i.e. translation) function employed in the data address assignment method of FIG. 8A are the MDB dimensions and dimensional hierarchy and variables in the RDBMS database, and that the outputs from the mapping function are a set of page allocation tables (PATs) preassigned to the plurality of processors associated with the parallel computing machine (i.e. platform) shown in FIG. 6.
Figure 8C:
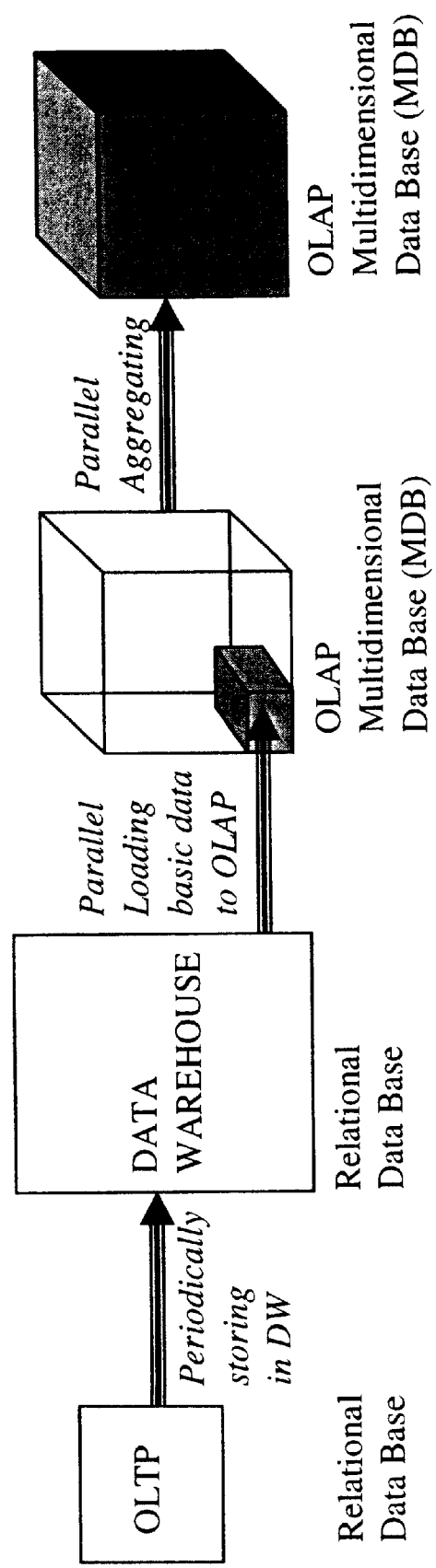
FIG. 8C is a schematic representation of a MOLAP system in accordance with the present invention, illustrating the process of periodically storing raw data in the Data Warehouse thereof, parallelly loading basic data from the Data Warehouse to the MDB, and the parallel process of pre-aggregating (or pre-compiling) the data in the MDB along the entire dimensional hierarchy thereof.

As illustrated in FIGS. 8A and 8B, the method of data element address assignment involves generating a data structure arranged as a set of page allocation tables or PATs. Each PAT, generated for and assigned to a particular processor $P_k$ on the parallel computing platform shown in FIG. 6, contains information relating (i) the n-dimensional integer-based Cartesian addresses of data elements in the MDB assigned to the specific processor $P_k$, to (ii) the integer-based physical address locations where the corresponding data elements (i.e. data records) are stored in the storage volumes associated with the specific processor $P_k$. In other words, each PAT assigned to a specific processor $P_k$ provides a one-to-one mapping between (i) each integer-based Cartesian address location in the MDB assigned to the processor $P_k$, and (ii) an unique integer-based physical-storage address location in the storage volume of the specific processor $P_k$.

In general, the physical storage address of each data element in the MDB (listed in its corresponding PAT) is generated by a two-step process comprising: first assigning each data element in the MDB (or more precisely, each integer-based logical/Cartesian address location in the MDB) to a specific processor $P_k$; and then generating a unique integer-based data storage address location within the physical storage volume of the specified processor FIG. 8A schematically depicts the process of assigning each data element in a three-dimensional MDB (or more precisely, each integer-based logical/Cartesian address location in the 3D MDB) to a specific processor $P_k$ on the parallel computing platform. As illustrated in FIG. 8A, this process of processor assignment involves using the following integer-based modular arithmetic function, namely: k=(D2+D1+D0) mod p for the case of a 3-D MDB, wherein:

k is the processor identity index (i.e. processor number) asssociated with the k-processor data Storage Space;

D2, D1 and D0 are the first, second, and third (business) dimensions of the MDB, respectively; and p is the number of processors employed on the parallel computing platform of the system.

For the general case of a n dimensional MDB, processor assignment is carried out using the following integer-based modular arithmetic function:

$$k=(Dn+D2+D1+D0) \bmod p \qquad (1)$$

As shown in FIG. 8B, the inputs to the mapping function employed in the data address assignment method of FIG. 8A are: (i) modular arithmetic function(s); (ii) the dimensions of the MDB and its dimensional hierarchy; and (iii) data variables from the relational database management system (RDBMS) of the Data Warehouse associated with the MDB. As illustrated in FIG. 8B, the outputs from the mapping function are a set of page allocation tables (PATs) generated for the plurality of processors associated with the parallel computing machine of FIG. 6.

Notably, in PAT generation process of FIG. 8B, each processor $P_k$ generates a unique integer-based physical storage address for storing each assigned data element within he physical storage volume of the specified processor $P_k$. In the case of a four processor p=4) computing platform, each processor $P_k$ generates a unique integer-based physical storage address for the assigned data element using the following local address generation formula:

$$\text{Loc}(D_0,D_1,D_2,D_3)=[(D_0+\text{size } D_0*(D_1+\text{size}D_1*(D_2+\text{size}D_2*D_3)))/p]$$

wherein: p represents the Number of processors; Di represents the running index of the i-th dimension; and Size D represents the modified size of i-th dimension by Size D=int((sizeD+p−1)*p) (wherein int implies truncating the result is to an integer value).

In the general case of an n-dimensional MDB, each processor $P_k$ generates a unique integer-based physical storage address for each data element assigned by formula (1) above using the following local address generation formula:

$$\text{Loc}(D_0,D_1,,D_n)=[(D_0+\text{size } D_0*(D_1+\text{size}D_1*(,,,*D_n)))/p] \qquad (2)$$

Method of Loading of Basic Data from Data Warehouse to MOLAP Parallel Machine

Figure 1B:
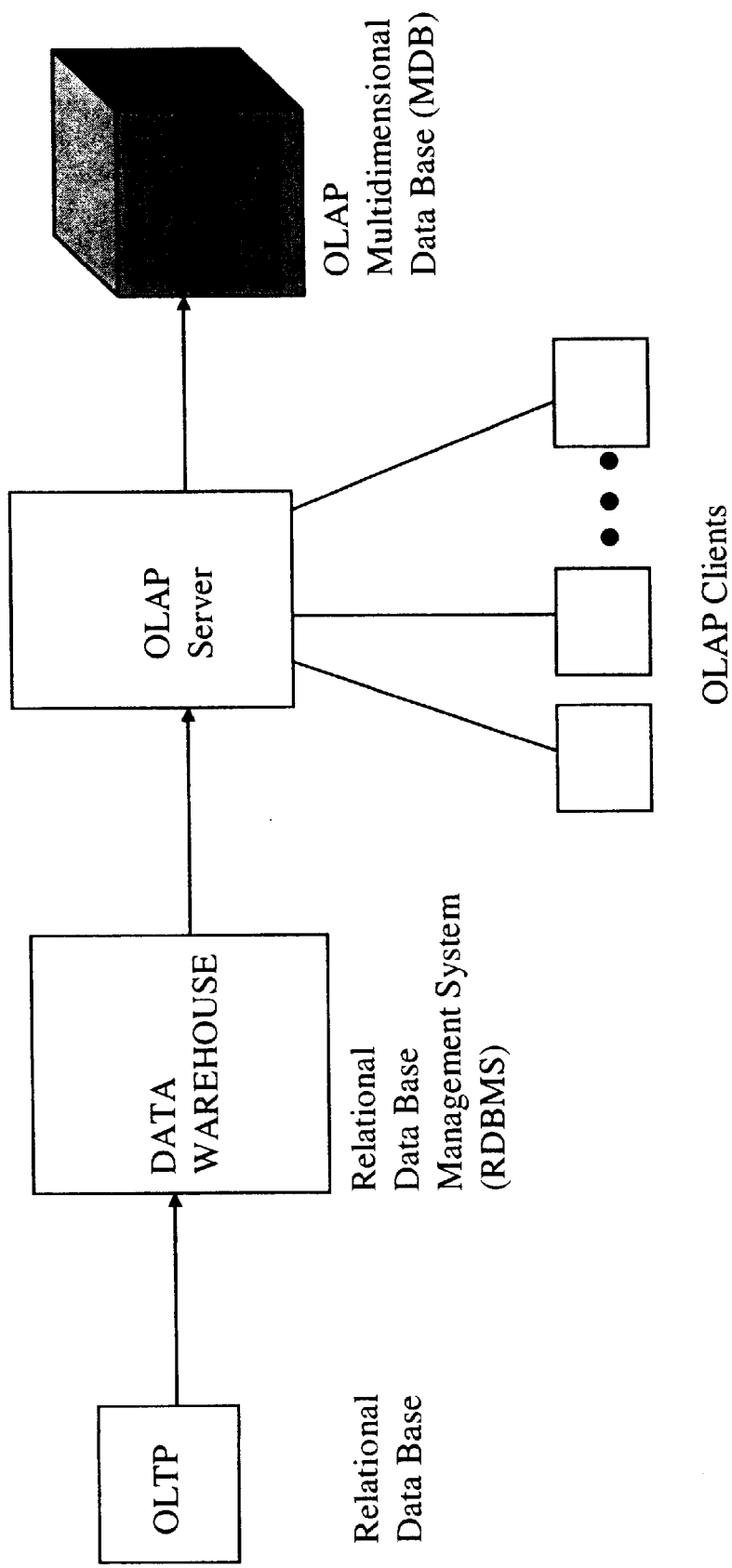
FIG. 1B is a schematic representation of a generalized embodiment of a prior art multidimensional on-line analytical processing (MOLAP) system comprising an on-line transactional processing (OLTP) relational database, a Data Warehouse realized as a relational database, an OLAP server, a plurality of OLAP clients, and an OLAP multidimensional database)
Figure 2A:
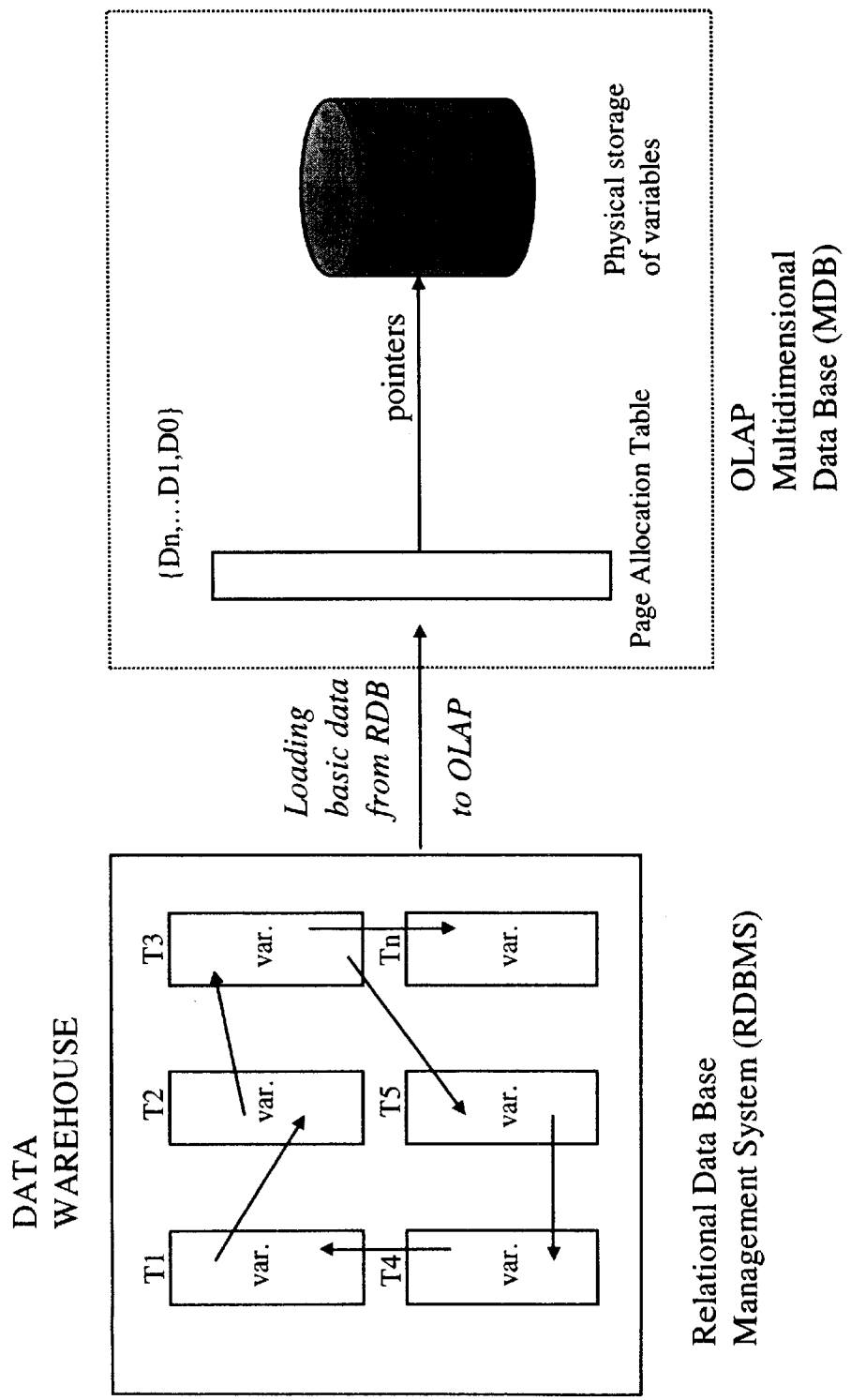
FIG. 2A is a schematic representation of the Data Warehouse shown in the prior art system of FIG. 1B comprising numerous data tables (e.g. T1, T2 . . . Tn) and data field links, and the OLAP multidimensional database shown of FIG. 1B, comprising a conventional page allocation table (PAT) with pointers pointing to the physical storage of variables in a information storage device.
Figure 2B:
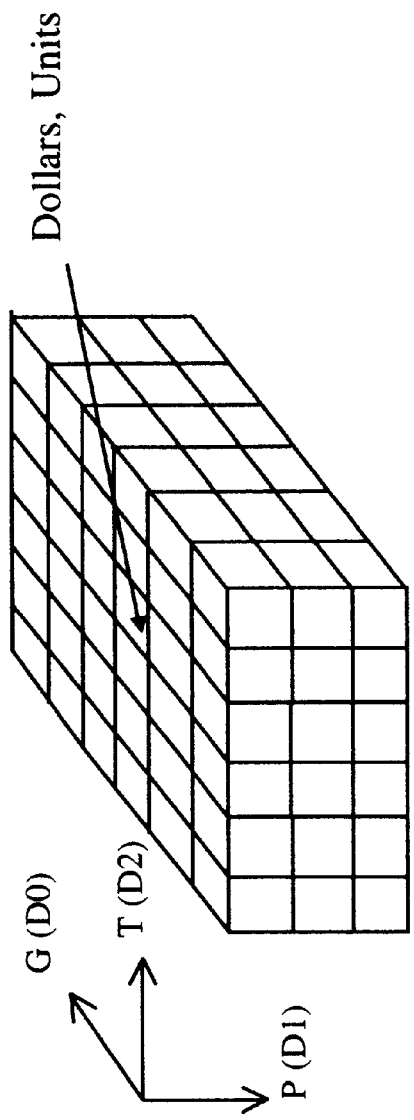
FIG. 2B is a schematic representation of an exemplary three-dimensional database and organized as a 3-dimensional Cartesian cube and used in the prior art system of FIG. 2A, wherein the first dimension of the MDB is representative of geography (e.g. cities, states, countries, continents), the second dimension of the MDB is representative of time (e.g. days, weeks, months, years), the third dimension of the MDB is representative of products (e.g. all products, by manufacturer), and the basic data element is a set of variables which are addressed by 3-dimensional coordinate values.
Figure 2D:
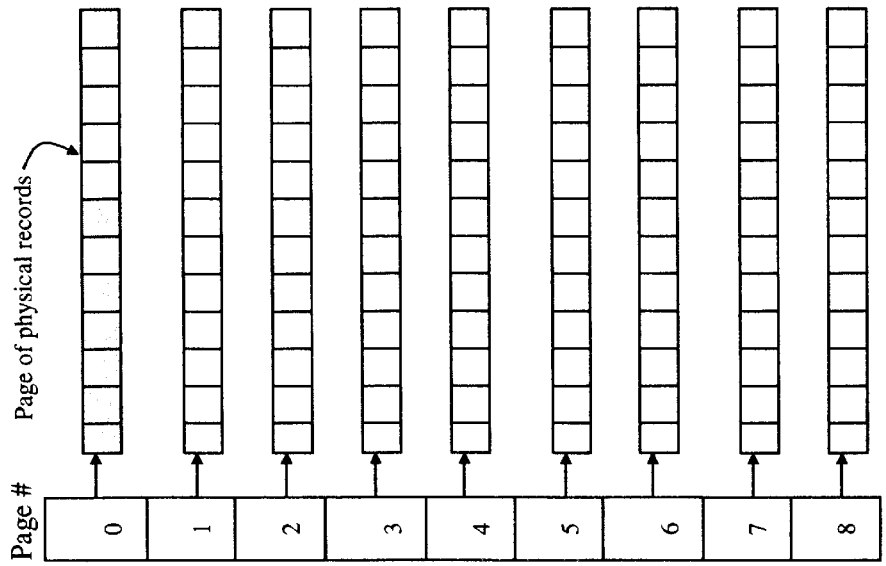
FIG. 2D is a schematic representation of a prior art page allocation table for an exemplary three-dimensional database, arranged according to pages of data element addresses.
Figure 2C:
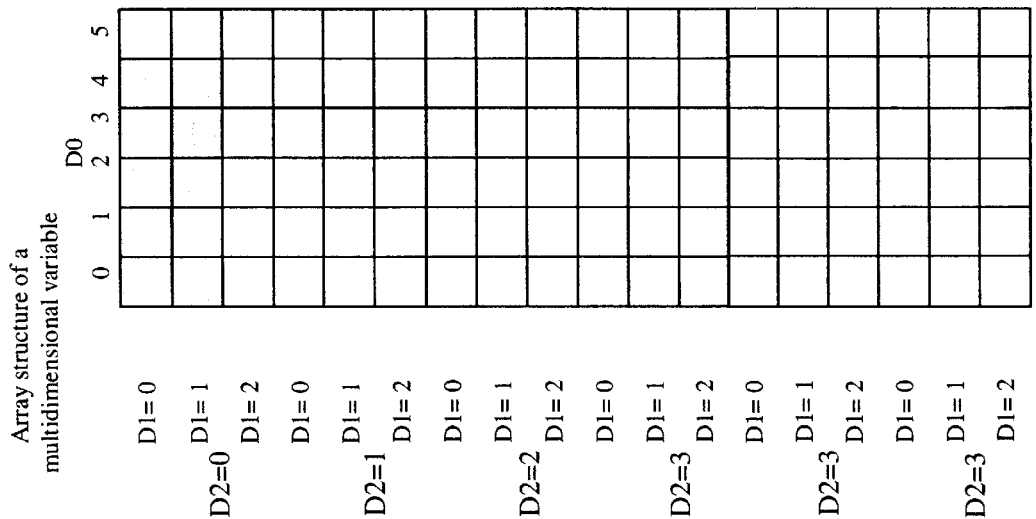
FIG. 2C is a schematic representation of a prior art array structure associated with an exemplary three-dimensional data, arranged according to a dimensional hierarchy.
Figure 10A:
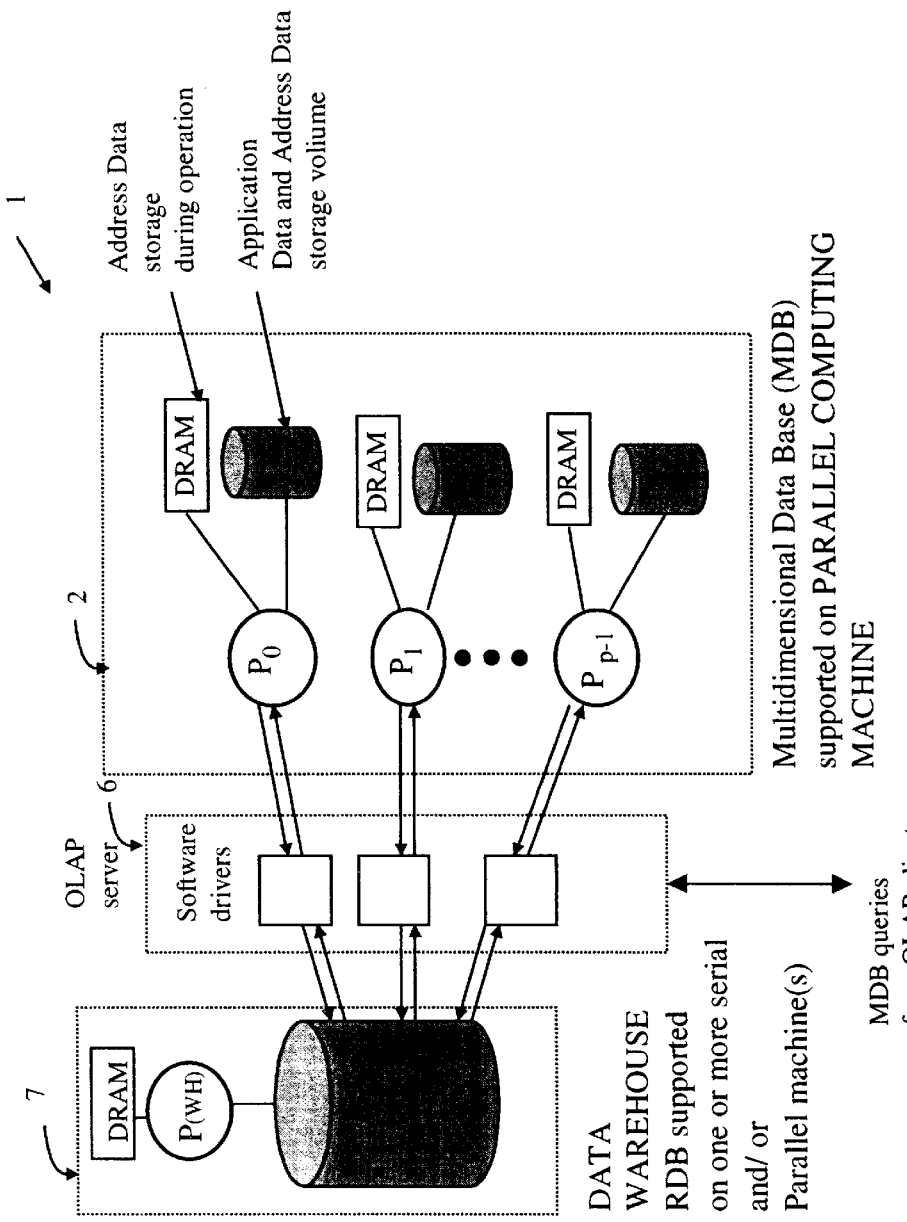
FIG. 10A is a schematic representation of the MOLAP system of the present invention shown in FIG. 6, illustrating the parallel loading of basic data from the Data Warehouse to the MDB supported on the parallel computing machine, using a plurality of software drivers provided for in the OLAP server of the MOLAP system.

In FIG. 9A1, there is shown a four-dimensional database which is generated during the parallel data element loading process of FIG. 10A which will be detailed hereafter. As shown in FIG. 9A1, the parallel data loading process is carried out between the RDBMS-based Data Warehouse of the system and the 4-D MDB supported on a four processor (p=4) parallel machine, as shown in FIG. 6, operated in accordance with the principles of the present invention. Notably, the parallel data element address mapping process depicted in FIGS. 8A and 8B, and characterized by the modular arithmetic formula (1) set forth above, is employed during the parallel data element loading process of FIG. 10A, and employs a plurality of software drivers provided for within the OLAP server of the system.

Figure 3A:
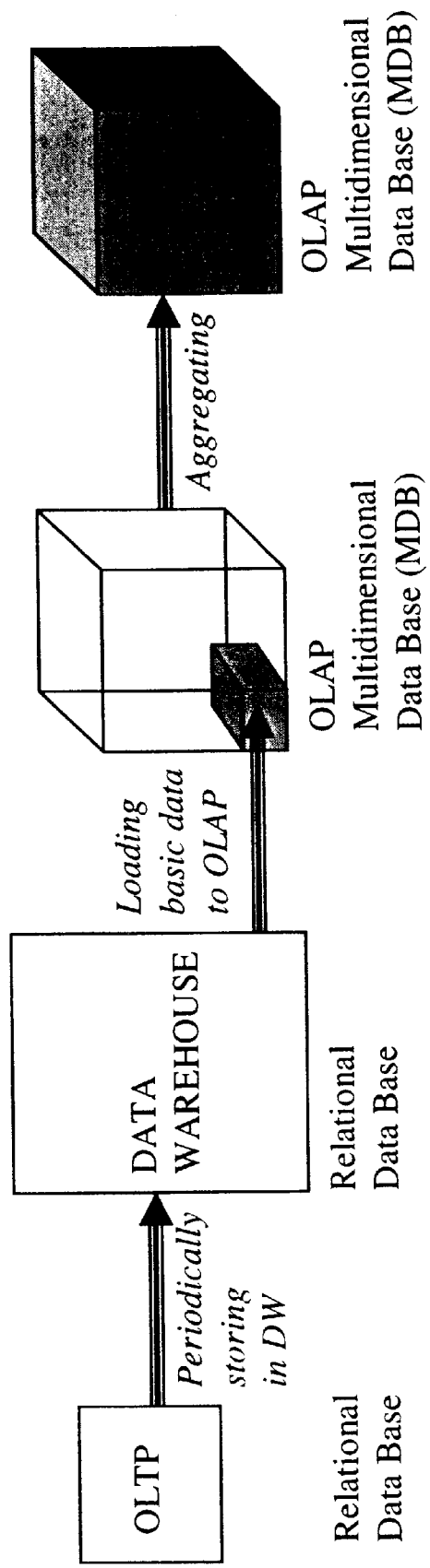
FIG. 3A is a schematic representation of a prior art MOLAP system, illustrating the process of periodically storing raw data in the Data Warehouse thereof, serially loading of basic data from the Data Warehouse to the multidimensional database (MDB), and the process of serially pre-aggregating (or pre-compiling) the data in the multidimensional database along the entire dimensional hierarchy thereof.
Figure 3B:
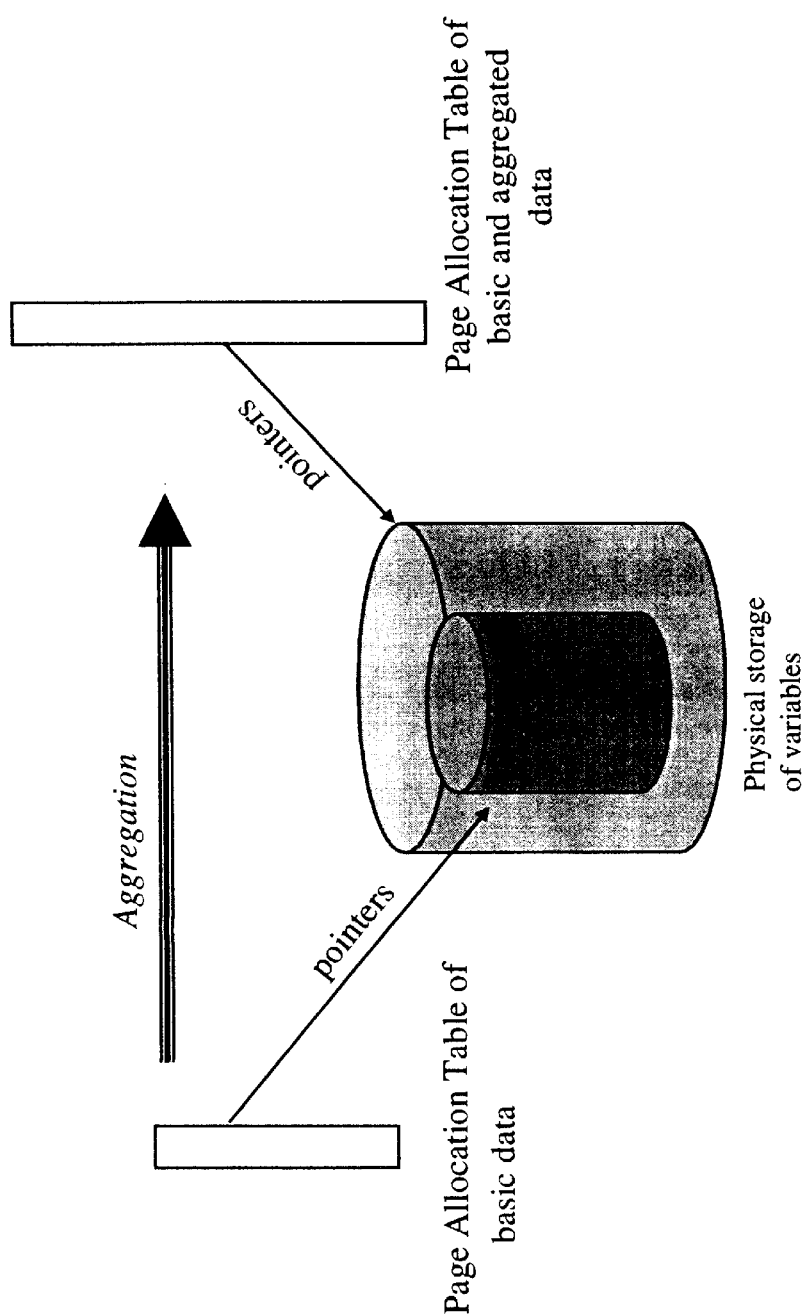
FIG. 3B is a schematic representation illustrating that the Cartesian addresses listed in a prior art page allocation table (PAT) point to where physical storage of data elements (i.e. variables) occurs in the information recording media (e.g. storage volumes) associated with the MDB, during the loading of basic data into the MDB as well as during data preaggregation processes carried out therewithin.
Figure 4:
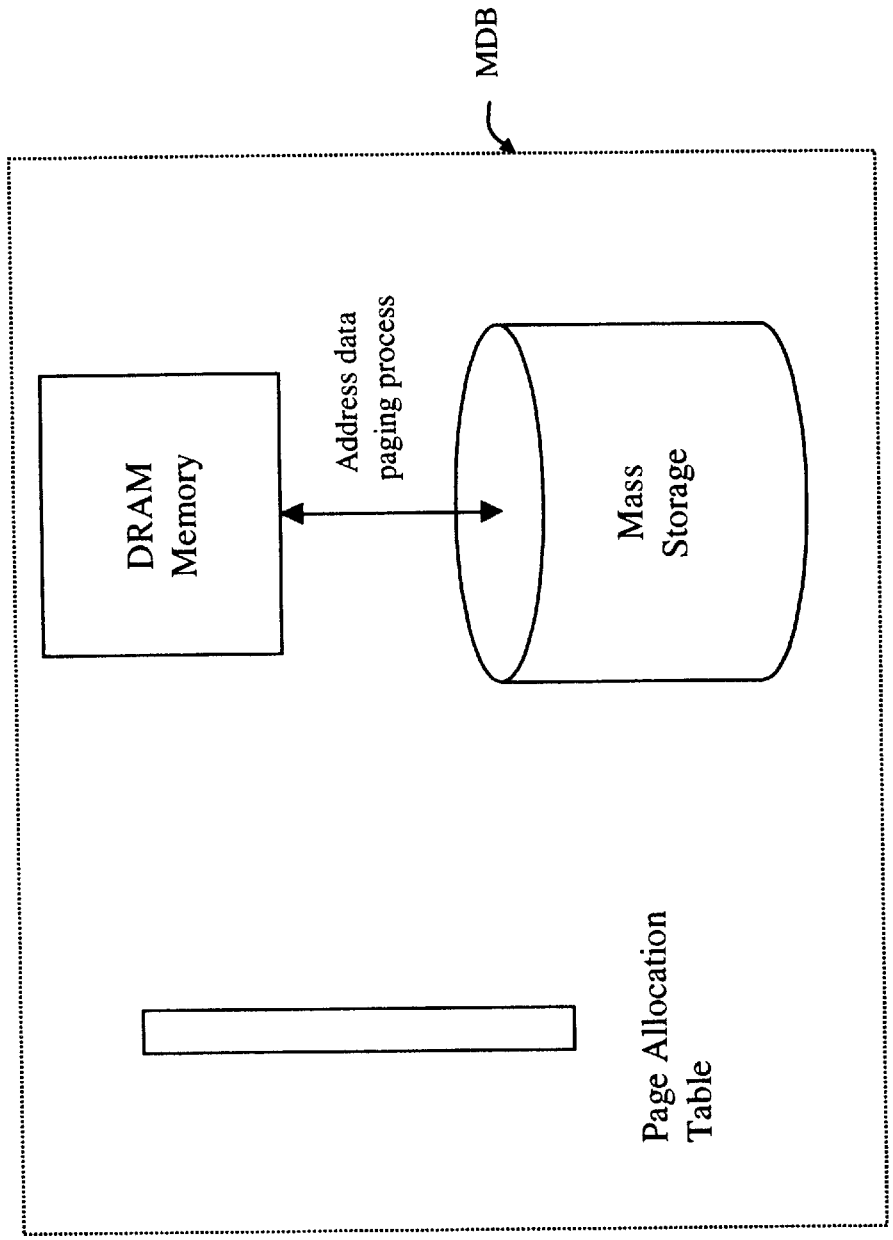
FIG. 4 is a schematic representation illustrating that, for very large prior art multidimensional databases, very large page allocation tables (PATs) are required to represent the address locations of the data elements contained therein, and thus there is a need to employ address data paging techniques between the DRAM (e.g. program memory) and mass storage devices (e.g. recording discs or RAIDs) available on the serial computing platform used to implement such prior art MOLAP systems.
Figure 5:
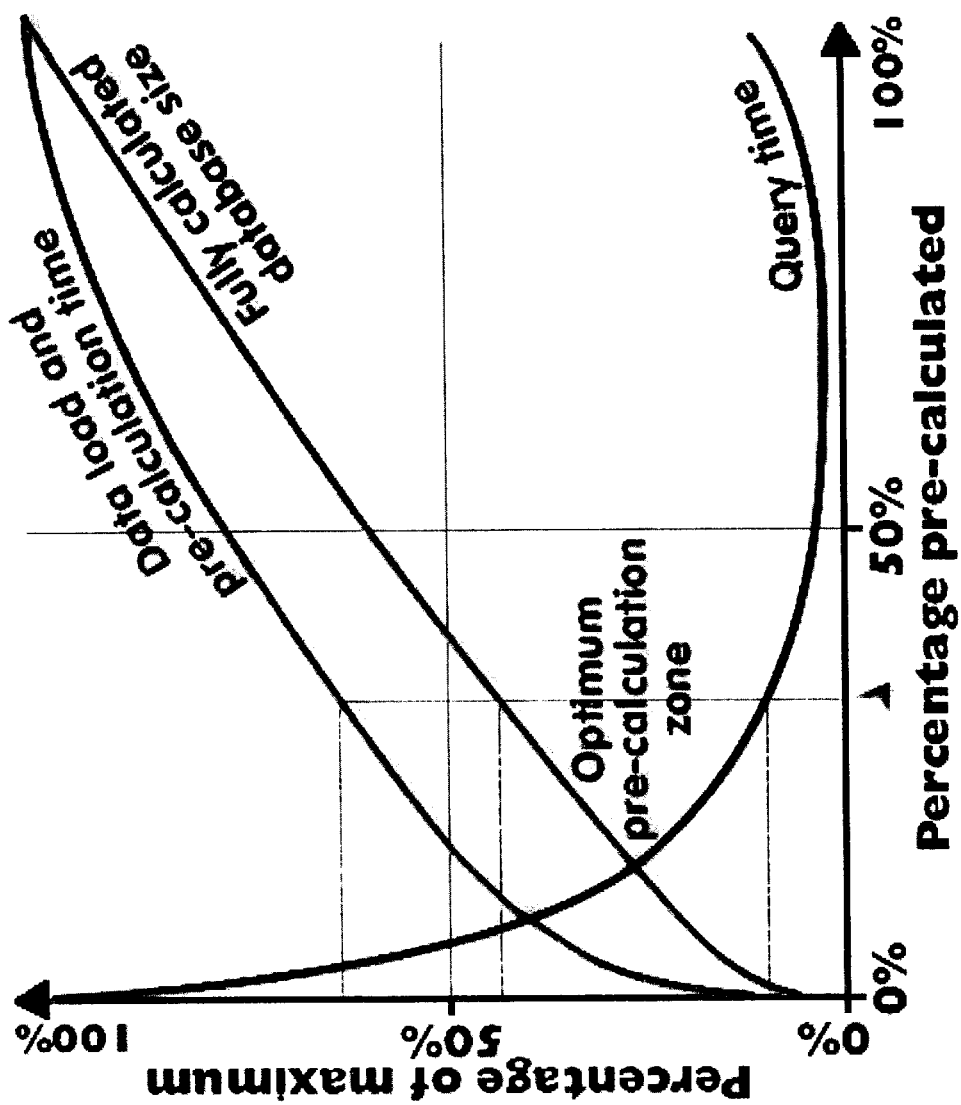
FIG. 5 is a graphical representation showing how search time in a conventional (i.e. prior art) multidimensional database increases in proportion to the amount of preaggregation of data therewithin.

As shown in FIGS. 9A1 through 9A4, the result of the mapping process during data loading operations is a uniform distribution of data elements of the MDB among processors. For the small example shown in FIG. 9A1, the amount of data elements mapped to each one the four processors is about the same, e.g. about 26 to 28. The largest possible variance is smaller than p (i.e. the number of processors on the parallel computing platform). For a realistic case, in which millions to billions of data elements are counted, such a variance is negligible. Moreover, the method is scalable only if any number of processors can be employed, without loosing the uniformity of distribution. FIGS. 9A1 to 9A4 show that the system and method of the present invention are scalable by the capacity thereof to evenly distribute data elements among a varying number of processors on the parallel computing platform. For example, FIG. 9A2 illustrates uniform distribution of data that results when the the data set is loaded among three (3) processors (p=3) on the parallel computing platform, wherein 36 data elements are assigned to each precessor. FIG. 9A3 illustrates that uniform distribution of data results when the data set is loaded among five (5) processors (p=5), wherein 20 to 23 elements are distributed to each processor. FIG. 9A4 illustrates that uniform distribution of data results when the data is loaded among six (6) processors p=6), wherein 18 data elements are distributed to each processor. Comparison of FIGS. 9A1 to 9A4 demonstrates that the address data mapping process of the present invention is scalable to any dimension MDB without causing a decrease in system performance.

Figure 10B:
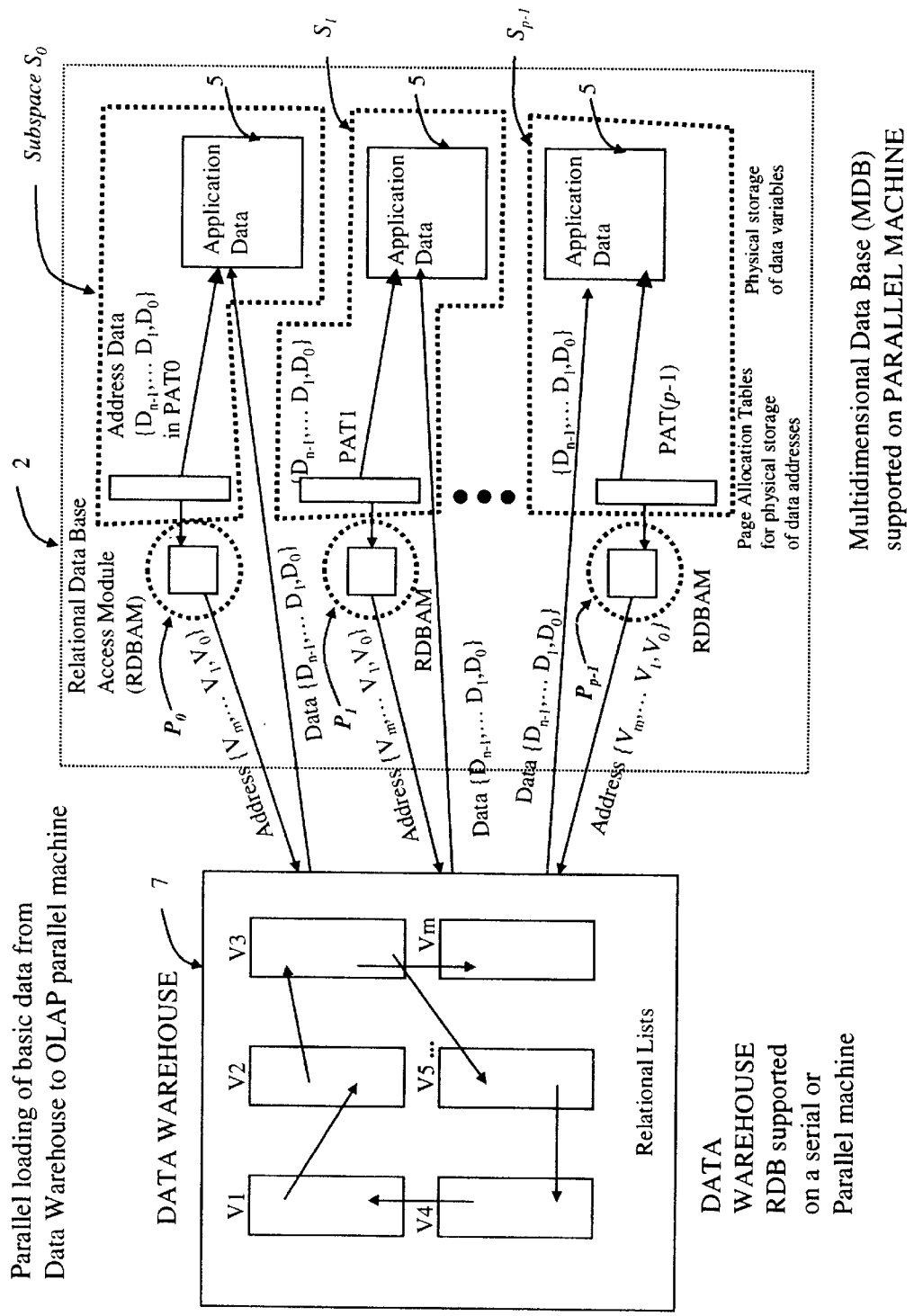
FIG. 10B is a schematic representation of the MOLAP system of the present invention shown in FIG. 10A, illustrating the parallel loading of basic data from the Data Warehouse to the MDB supported on the parallel computing machine, using the data element address assignment method shown in FIG. 8A.

In FIG. 10A, the process of loading basic data from the RDBMS-based Data Warehouse to the MOLAP parallel machine is shown carried out in a parallel manner in accordance with the principles of the present invention. As shown therein, each one of the loading processes is handled by a separate processor. This process of parallel data loading is illustrated in greater detail in FIG. 10B. Each processor governs its own subspace, according to the mapping scheme of FIGS. 8A and 8B, characterized by formulas (1) and (2) set forth hereinabove. The relational data base access module or manager (RDBAM) shown in FIG. 10B is a software tool used to define the mapping between relational and multi-dimensional models employed in the system of the present invention. A commercially available RDBAM subsystem is sold by the Oracle Corporation, under the tradename ORACLE Express Relational Access Manager (RAM), described in detail at the uniform resource locator (URL) http://www.oracle.com/olap/collatrl/ramds.pdf.

The function of the RDBAM is to generate the address of a basic data element based on Warehouse Metadata contained in a Data Warehouse Metadata directory, and then access the basic data element from within the set of relational lists comprising the RDBMS-based Data Warehouse. Warehouse Metadata contained in the Warehouse Metadata directory consists of information describing the Warehouse data contained in the RDBMS-based Data Warehouse, and is stored together with the Warehouse data. The function of the Data Warehouse Metadata directory is to describe the detailed structure of the relational data (Star, Snowflakes, etc.), dimensions, and hierarchy relations associated with the RDBMS-Data Warehouse. Using the Warehouse Metadata directory, every candidate element of the MDB may be found in the set of lists of the RDBMS-based Data Warehouse. For example, for a 4-D MDB, where a data element is defined by four coordinates, its value will be collected from several 2-D relational lists in the RDBMS-based Data Warehouse using the Warehouse Metadata directory.

Figure 11A:
FIG. 11A is a schematic representation illustrating the internal addressing of data elements in the Storage Space of processor p0, in the particular case of FIG. 9A1, in accordance with the present invention.
Figure 11C:
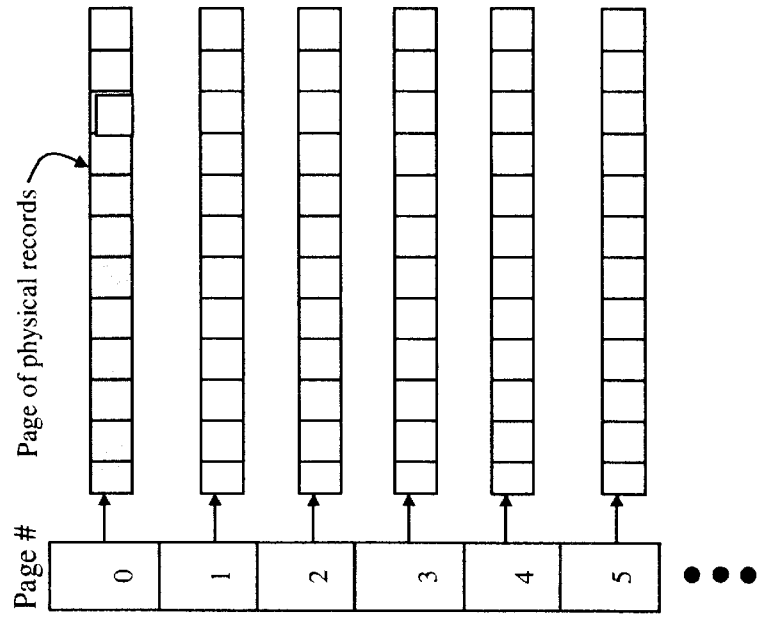
FIG. 11C is a schematic representation of a Page Allocation Table of processor $P_j$, for the exemplary array of FIG. 11B, arranged according to pages of data element addresses.
Figure 11B:
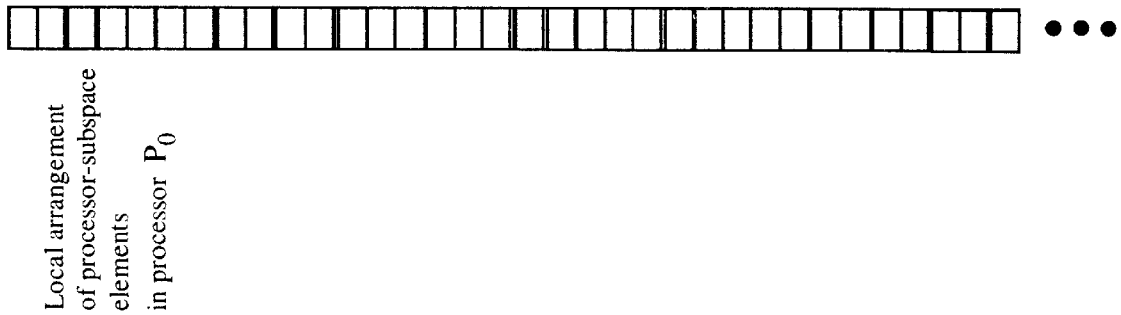
FIG. 11B is a schematic representation of an array of data elements in the Storage Space of processor p0 (of FIG. 11A), arranged according to the present invention.

At the beginning of the data loading process, illustrated in FIG. 10B, the relational map of the Warehouse Metadata directory (i.e. at the initialization phase), and the Multidimensional Database (MDB) map of the present invention, as defined by FIG. 8A, are loaded into the RDBAM associated with each processor $P_k$. All the communication between RDBAM and the RDBMS-based Data Warehouse is carried out by means of SQL language. For each processor $P_k$, the Warehouse Metadata directory will be the same. However, the MDB map will be different, in order to properly map the subspace assigned to the specific processor, according to the modular mapping scheme of the present invention. The Data Warehouse Metadata directory is then used to generate the address of a basic data element stored within the set of relational lists comprising the RDBMS-based Data Warehouse. After accessing its data value, the data element is physically stored in a mass storage device on the parallel computing machine, according to the Page Allocation Table assigned to the processor which addressed the basic data element. In the case of a four processor (p=4) computing platform, the local address within the $P_k$ processor s storage volume is computed using the modular arithmetic formula (2) set forth above. For the particular case of FIG. 9A1, FIG. 11 A illustrates the internal mapping of data elements in processor p0. In the general case of an n-dimensional MDB, the local address within the $P_k$ processor s storage volume is computed by formula (2) set forth above.

Method of Preaggregating Data within the MDB of the Present Invention

Figure 12A:
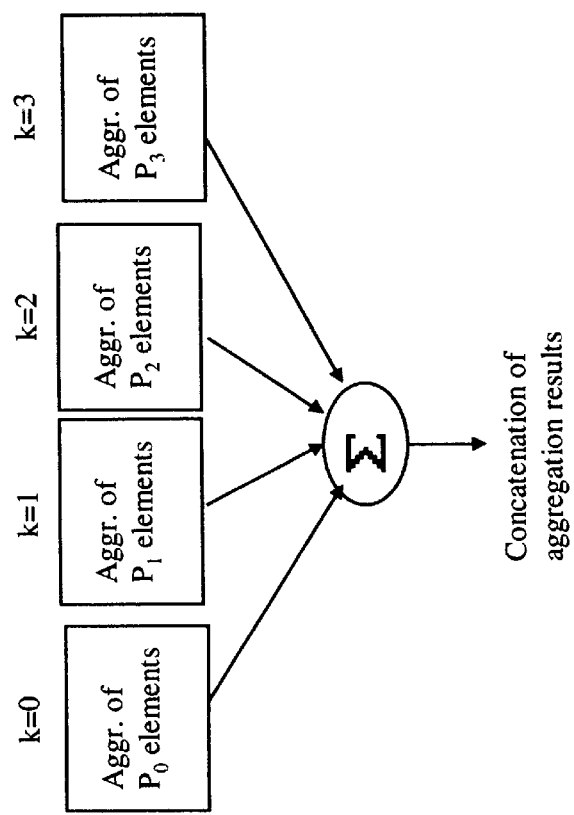
FIG. 12A is a schematic representation depicting the parallel data aggregation process of the present invention, shown carried out on a parallel machine of the type shown in FIG. 6 having 4 processors (p=4) operating in accordance with the present invention, and showing that partial aggregation results from the processors are concatenated into a final result by interprocessor communication provided for within the parallel computing machine.

As illustrated in FIG. 12A, the preaggregation process of the present invention supported on a parallel machine, as shown in FIG. 6, involves carrying out partial aggregations at each processor, and then concatenating the partial results into a final result by means of interprocessor communication enabled by the parallel machine.

FIGS. 12B1 to 12B4 schematically depict the uniform load balancing characteristics that are achieved during pre-aggregation carried out by the method of the present invention. This process will be detained hereinbelow.

Figure 7A:
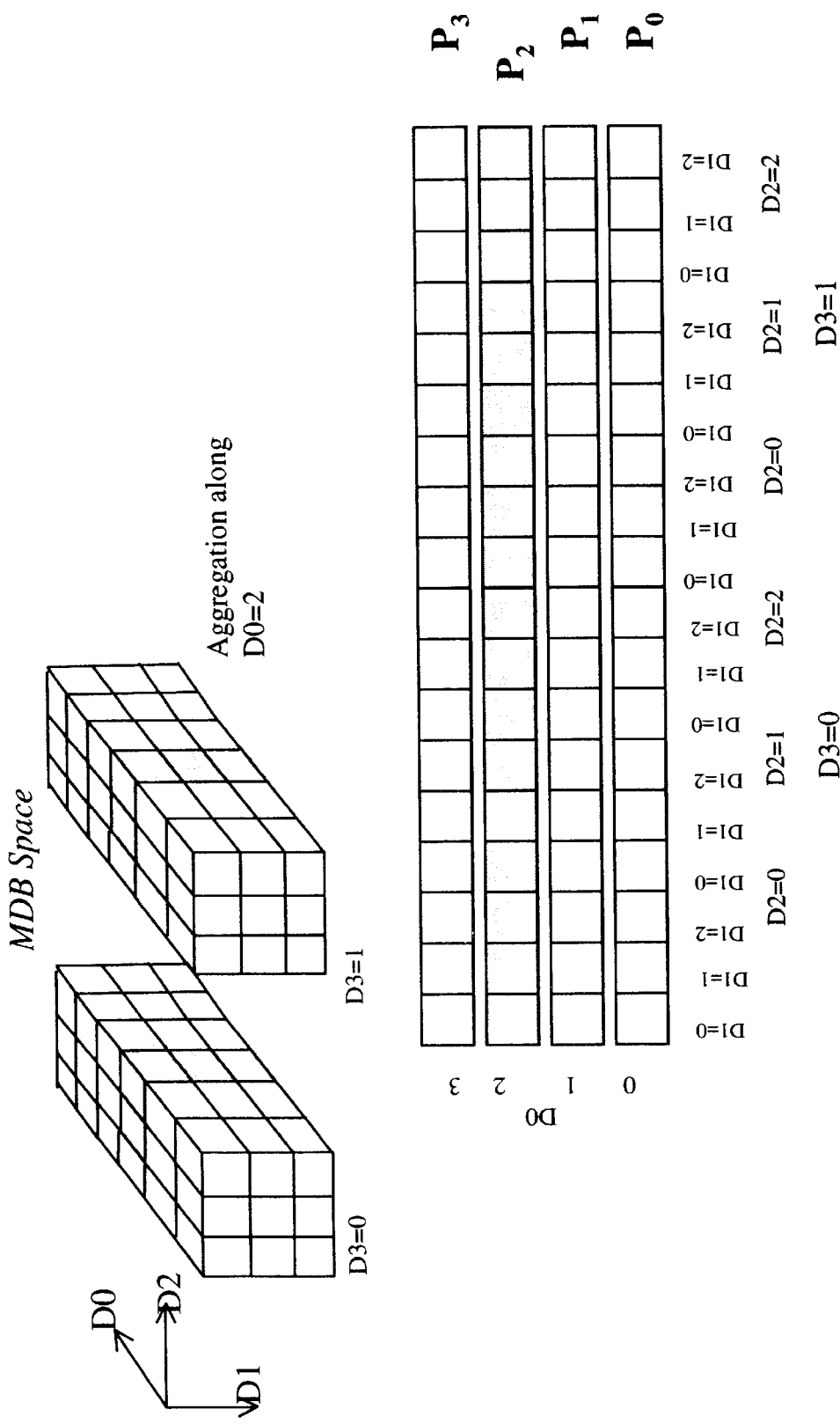
FIG. 7A is a schematic representation illustrating a first method of data element address assignment in accordance with the present invention which involving the partitioning a conventional 4-D array of data by splitting according the lowest dimension of the MDB, wherein this method can be used during both data element loading and preaggregation processes subject to the shortcomings and drawbacks set forth in FIG. 7C.

As shown in FIG. 12B1, when carrying out the parallel-based method of data preaggregation according to the present invention, each processor $P_k$ in a four-processor parallel computing machine is assigned approximately the same number of data elements during data aggregation along the D0=2 multidimensional cross-section within a 3-D type MDB supported thereupon. This is in marked contrast with the method of FIG. 7A, wherein all the pre-aggregated data is located in a single processor s subspace, necessitating that sequential processing be be carried out.

Figure 7B:
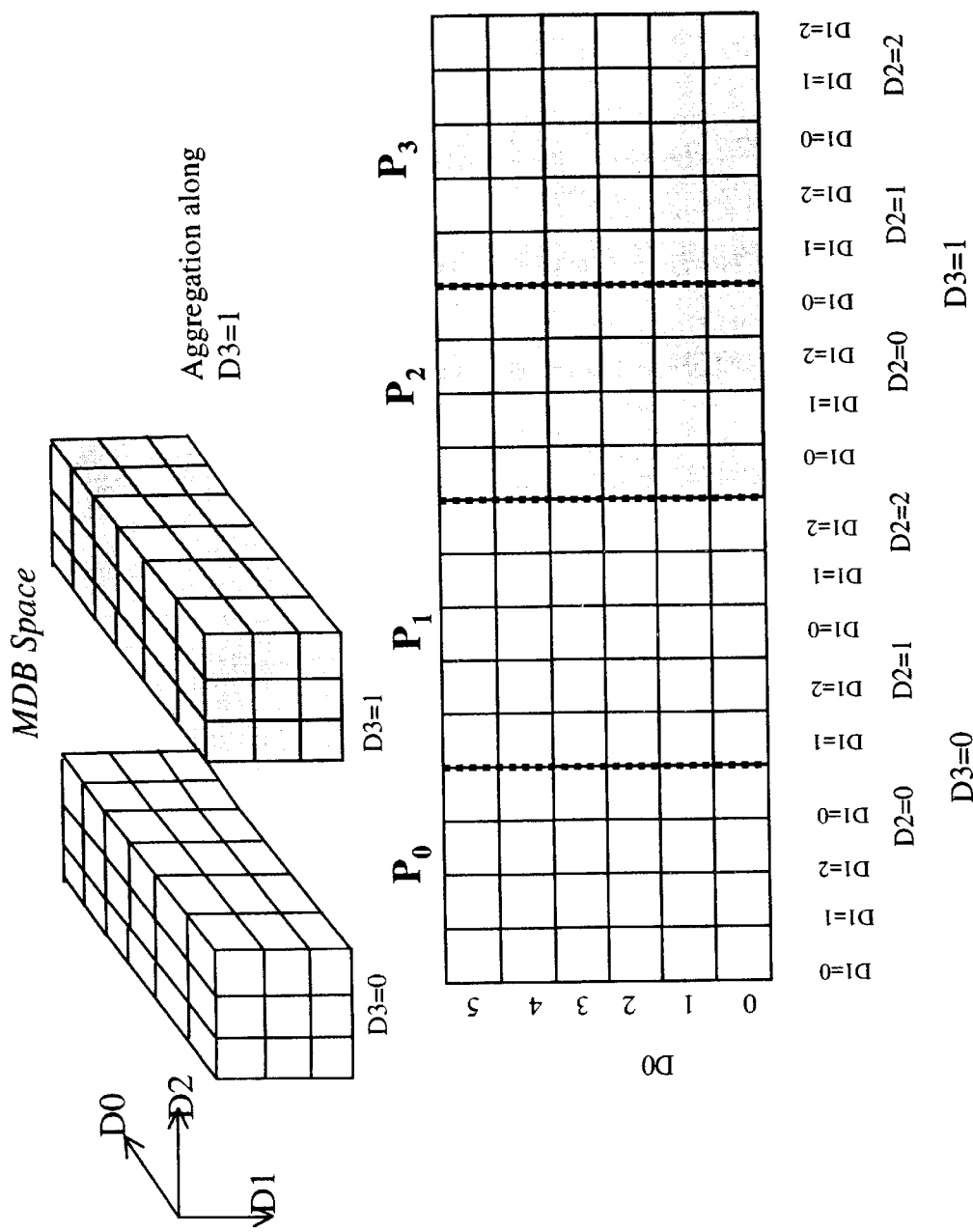
FIG. 7B is a schematic representation illustrating a second method of data element address assignment in accordance with the present invention which involves partitioning a conventional 4-D array of data by splitting the multidimensional data according the highest dimension of the MDB, wherein this method can be used during both data element loading and preaggregation processes subject to the shortcomings and drawbacks set forth in FIG. 7C.

As shown in FIG. 12B2, when carrying out the parallel-based method of preaggregation according to the present invention, each processor on a four-processor parallel computing machine is assigned fairly the same number of data elements during data aggregation along the D3=1 multidimensional cross-section within a 3-D type MDB supported thereupon. This is in marked contrast with the method of FIG. 7B where all the pre-aggregated data is located in two processor subspaces, eliminating the possibility of load balancing among processors.

As shown in FIG. 12B3, when carrying out the parallel-based method of preaggregation according to the present invention, each processor on a four-processor parallel computing machine is assigned fairly the same number of data elements during data aggregration along the D1=1 multidimensional cross-section within a 3-D type MDB supported thereupon.

As shown in FIG. 12B4, when carrying out the parallel-based method of preaggregation according to the present invention, each processor on a four-processor parallel computing machine is assigned fairly the same number of data elements during data aggregration along the D2=1 multidimensional cross-section within a 3-D type MDB supported thereupon.

Referring to FIGS. 12C1 to 12C3, the parallel data aggregation process of the present invention will now be described in greater detail. In FIG. 12C1, the parallel data aggregation process is illustrated for the case of a 3-D type MDB. Every data element of the base (or raw) data in the MDB is summed up to produce the pre-aggregate data of the next hierarchy in each of the dimensions of the MDB. Every data element is handled only once during the data aggregation process. The same is done with other data elements obtained from the base data of the Data Warehouse, wherein each data element is summed up to the next hierarchy of dimensions.

In FIG. 12C2, the parallel data aggregation process of the present invention is illustrated for the case of a 5-D type MDB. As shown in FIG. 12C3, in order to save space and I/O access time, the data is maintained mostly in a compressed state. Only the directly processed data handled by the aggregation program is maintained in a non-compressed state. Otherwise, all other data elements on the disk and in the main memory are maintained in a compressed state. Moving the data between main memory and the disk associated with each processor is accomplished in a virtual memory fashion, well known in the computing art.

Figure 13A:
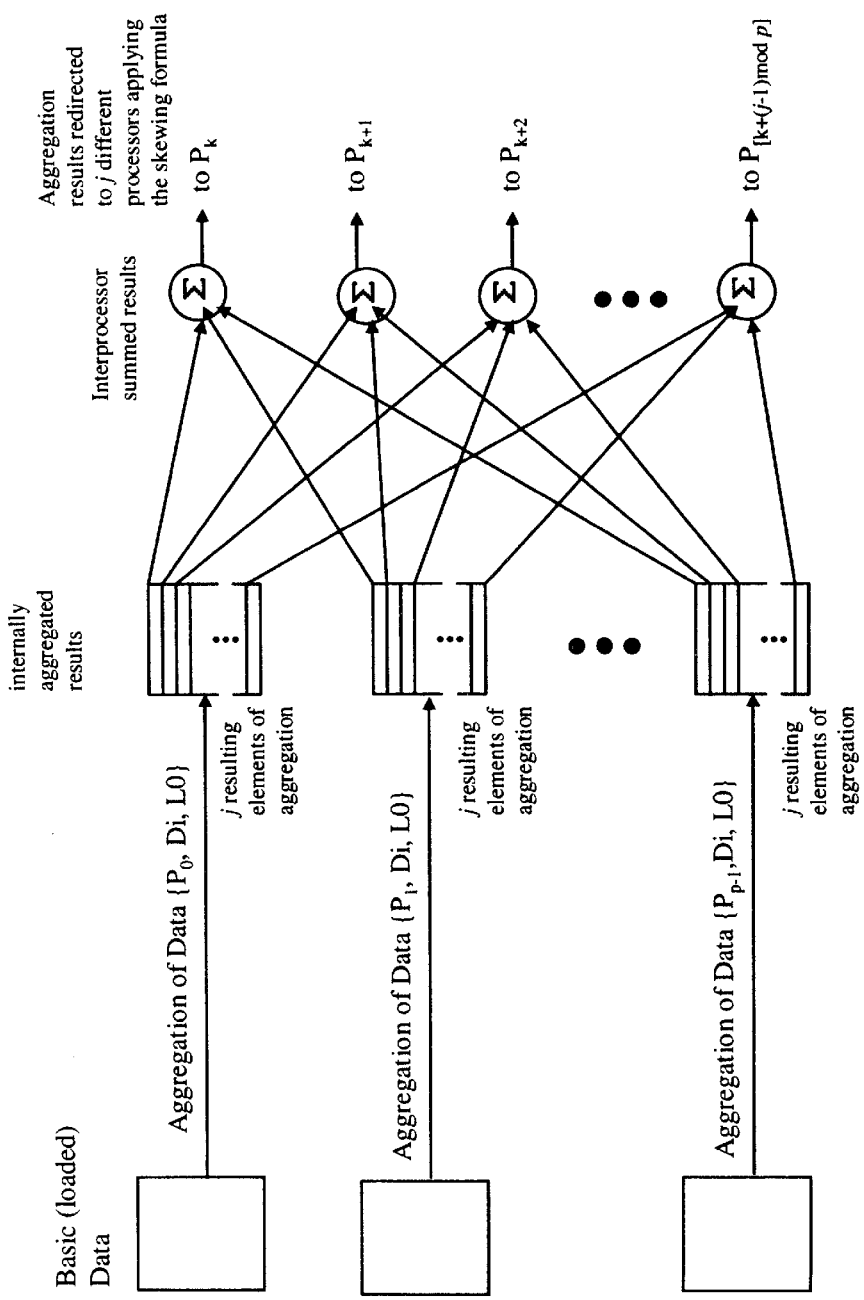
FIG. 13A is schematic representation of the parallel-based method of preaggregation according to the present invention, illustrating the first aggregation level L=0 along dimension Di, where all p processors on the parallel computing platform are participating in the data aggregation process.
Figure 13B:
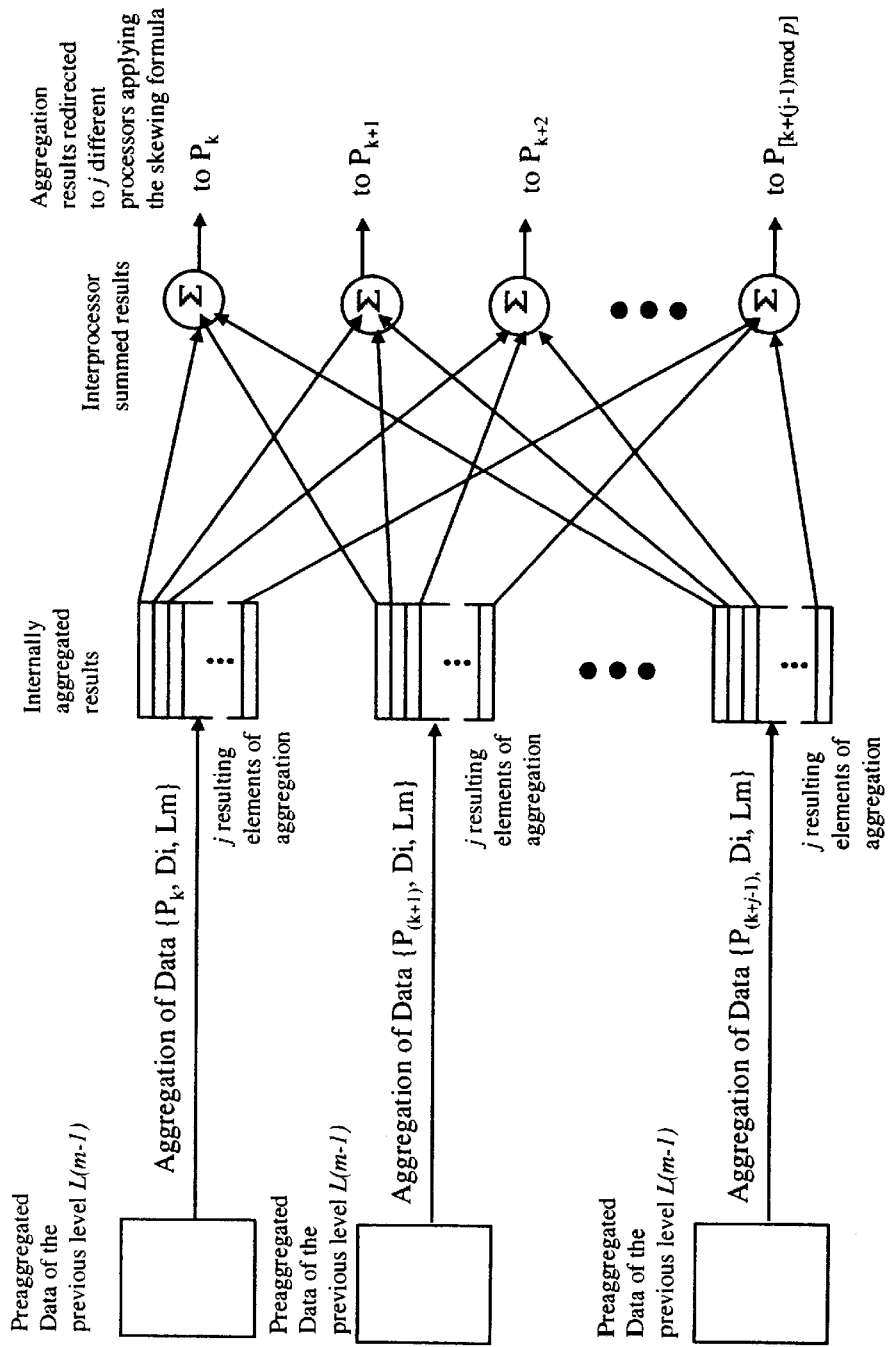
FIG. 13B is schematic representation of the parallel-based method of preaggregation according to the present invention, illustrating the Lm-th aggregation level along dimension Di, where all j processors on the parallel computing platform are participating in the data aggregation process.

Referring to FIGS. 13A and 13B, the parallel-based method of data pre-aggregation according to the present invention will now be described in greater detail. In FIG. 13A, the first aggregation level L=0 along dimension Di is schematically depicted, where all p processors on the parallel computing platform are shown participating in the aggregation process of the loaded (basic) data. The partial results of the aggregation process are concatenated, and then stored according to the address data mapping scheme of the present invention described in detail hereinabove. Notably, not all p processors are necessarily involved in generating the resulting data set, but rather only a subset of the p processors, indicated by the index j, specified by processor indices: $P_k$ to $P_{[k+(j-1) \bmod p]}$. These processors will participate in the second level of aggregation, where the results are stored according to the address data mapping scheme of the present invention.

In FIG. 13B, the Lm-th aggregation level along dimension Di is schematically depicted, where all j processors on the parallel computing platform are participating in the data aggregation process. As in FIG. 13A, the partial results of the aggregation process are concatenated, and then stored according to the address data mapping scheme of the present invention described in detail hereinabove.

Figure 14A:
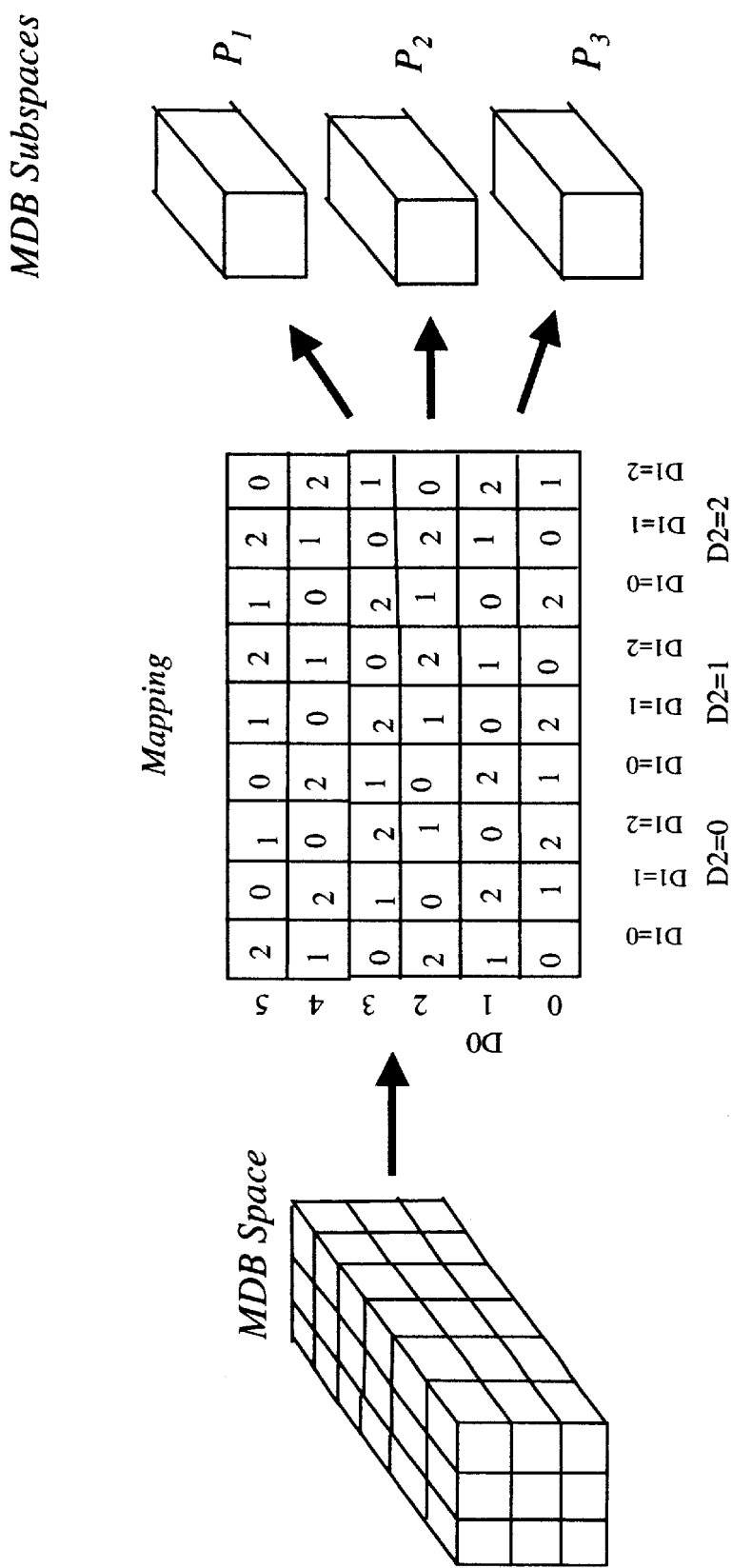

In FIGS. 14A through 14B3, an inductive proof is provided to demonstrate that the data element loading and aggregation processes of the present invention can be used with an MDB having any dimensionality or hierarchy of dimensionality, provided that each unit of dimensionality is indexed using integer-based arithmetic, in accordance with the requirements of the address data mapping technique of the present invention described herein above.

FIG. 14A illustrates the case of a 3-D MDB, wherein the dimensions D0–D2 form a cube. As shown therein, the address data mapping scheme of the present invention can be applied to this 3-D type MDB, whereby the cube of data is evenly divided among three processors. FIG. 14B illustrates that the address data mapping scheme of the present invention can be applied to any n-dimensional MDB. In FIG. 14B1, the address data mapping method is shown applied to 3-D data cube (i.e. 3-D type MDB), whereas in FIG. 14B2 the address data mapping method is shown applied to a 4-D data cube (i.e. 4-D type MDB) which is merely a multiplication of 3-D data cubes. In 14B3, the method is shown applied to a 5-D data cube (i.e. 5-D type MDB) which is simply a multiplication of 4-D data cubes, etc. Collectively, these illustrations prove, inductively, that the address data mapping scheme of the present invention can be applied to any n-dimensional MDB without any significant compromise in performance, and thus can be said to be highly scalable in the computational sense.

Other Applications of the Present Invention

While the system and method of address data translation of the present invention has been applied above to provide a novel system and method of carrying out MOLAP operations, it is understood that this method can be used in numerous other data management operations as well.

MBD-Based URL-Directory of the Present Invention

For example, the address data mapping method of the present invention can be used to provide an improved system and method of searching and accessing an index of information resource locators (URLs) on the Internet, referred to hereinafter as an MBD-based URL-Index or Directory system, denoted by reference numeral 20 in FIG. 15A. In system 20, there may or may not be any need for data aggregation as in the above described MOLAP application, shown in FIGS. 6–14B3. In system 20, the dimensions of the MDB will be selected on the basis of the URL/Web-site classification scheme embodied within the structure of the URL directory. For example, referring to the Yahoo® Internet Information Resource Directory located at http://www.yahoo.com, it is noted that as of Jun. 28, 1999, the URL classification scheme employed by this particular URL directory includes, at its top level scheme, the following twelve (12) information categories: Arts and Humanities; Business & Economy; Computers & Internet; Education; Government; Health; News & Media; Recreation & Sports; Reference; Regional; Science; Social Science; and Society & Culture. These information categories can be defined as the high-level dimensions of the MDB of this embodiment of the present invention. Referring to the information category Arts and Humanities, which would be one of the high-level dimensions of the MDB, it is noted that as of Jun. 28, 1999, this high-level information category has the following information sub-categories: Art History; Artists; Arts Therapy; Awards; Booksellers; Censorship; Chats and Forums; Companies; Crafts; Criticism and Theory; Cultural Policy; Cultures and Groups; Design Arts; Education; Employment; Events; Humanities; Institutes; Museums, Galleries, and Centers; News and Media; Organizations; Performing Arts; Reference; Thematic; Visual Arts; Web Directories. Notably, these information subcategories would be defined as the subdimensions below the dimension Arts & Humanities. As shown in FIG. 15B, each of the subdimensions defined above can be further decomposed into additional information categories, as revealed at the Yahoo Website. Based along the above-described lines, an MDB-based URL directory, as described along the lines set forth above, can be constructed in a straightforward manner in accordance with the principles of the present invention.

Figure 15A:
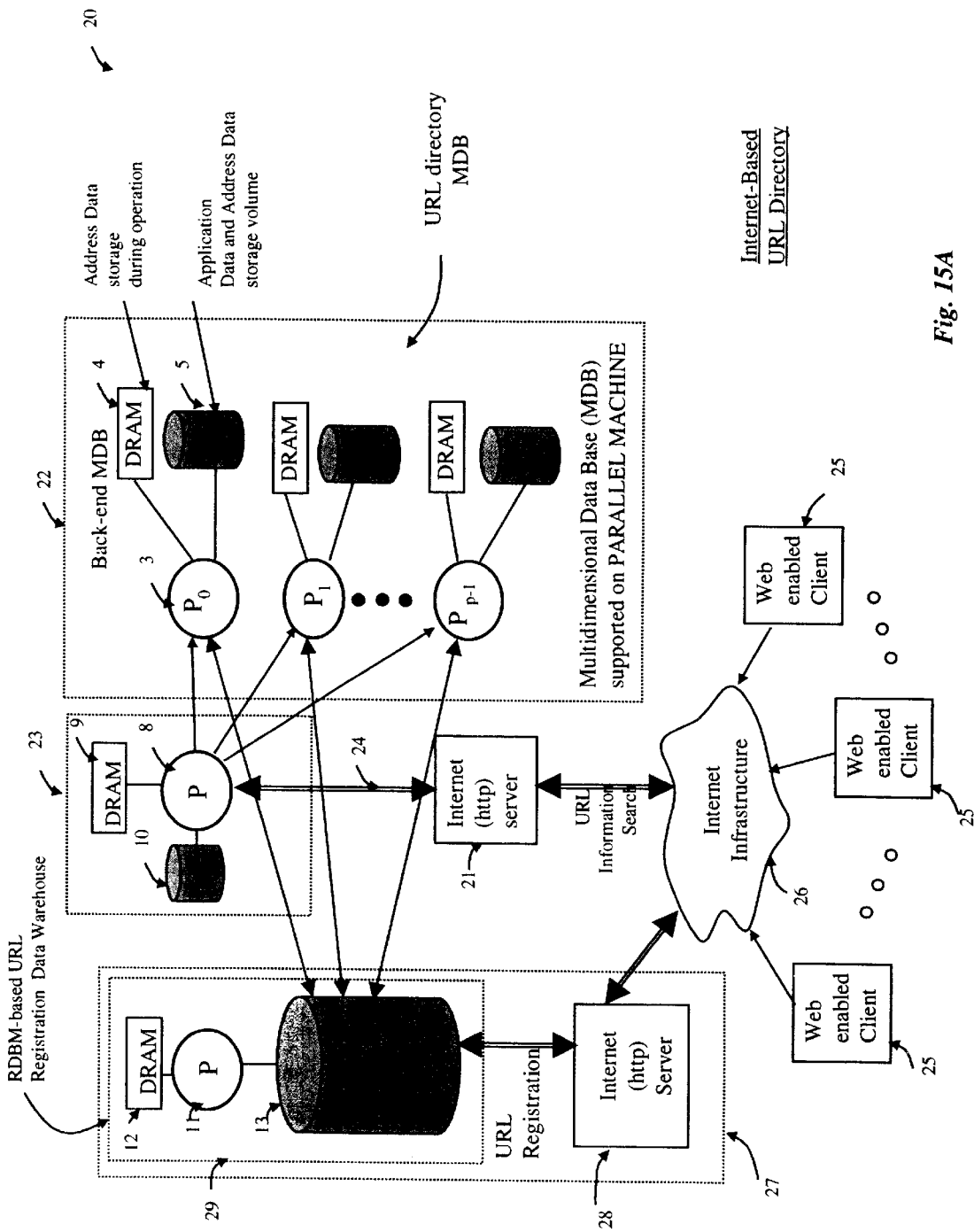
FIG. 15A is a schematic representation of an Internet URL directory system according to the present invention, wherein a parallel computing machine is used to realize the MDB-based URL Directory (or Index) thereof using any one of several possible types of data element addressing methods in accordance with the principles of the present invention, whereas a relational database management system (RDBMS) is used to realize the Internet URL registration subsystem thereof.
Figure 15B:
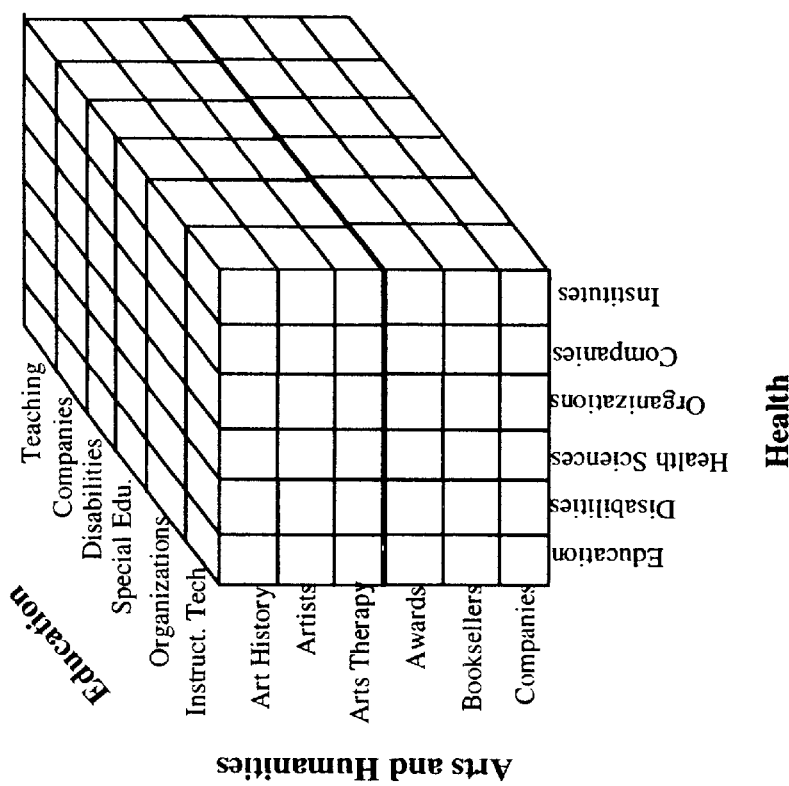
FIG. 15B is a schematic representation of an exemplary three-dimensional database of an Internet URL Directory organized as a 3-dimensional Cartesian cube according to the present invention, wherein the first dimension of the MDB is representative of Health, the second dimension of the MDB is representative of Arts and Humanities, the third dimension of the MDB is representative of Education, and the basic data element is a set of YWW (e.g. HTML or XML) Pages which are addressed by 3-dimensional coordinate values.

As shown in FIG. 15A, the MDB-based URL directory system 20 comprises: an Internet (i.e. http) information server (e.g. Origin 2000 Server from Silicon Graphics, Inc.) 21 connected to the infrastructure of the Internet, a back-end parallel computing system 22 for supporting the MDB-based URL directory described above, and an OLAP server 23, operally connected to Internet information server 21 by a high-steel information network 24. The MDB-based URL directory is interfaced with the http information server 21 by way of a common gateway interface (CGI), Java-scripts, or like processes well known or otherwise to be developed in the art. Information contained in the MDB-based URL directory is accessible by any web enabled client machine 25 operably connected to the infrastructure of the Internet 26, in a manner known in the art.

As shown in FIG. 15A, the MDB-based URL directory system 20 also includes an information registration subsystem 27 comprising an Internet (i.e. http) information server 28, connected to a relational database management system (RDBMS) 29 realized using a robust database development program, such as Oracle i6 from the Oracle Corporation. The main function of the information registration subsystem 27 is to enable owners or agents of Internet-based information resources (e.g. HTML documents, XML documents, and the like) to register such information resources with the MDB-based URL Directory in accordance with the current information classification scheme being employed by the directory system 20. Anyone having a Web (http) enabled client machine 25, equipped with a http browser, can register Internet documents with the subsystem 27 in a quick and simple manner by accessing an HTML-encoded form from the http server 28, completing the form and returning the same thereto for analysis and updating the RDBMS. Alternatively, Web-enabled EDI processes can be used between the client machines 25 and the http server 28, properly EDI-enabled, in order to transfer URL information to the RDBMS-based URL Registration Data Warehouse 29. With the above-described system arrangement, the RDBMS 29 can be continuously updated during the course of the day, and then used to update the MDB-based URL at predetermined times during the day and/or evening when peak demand for directory services is expectedly reduced.

Figure 16:
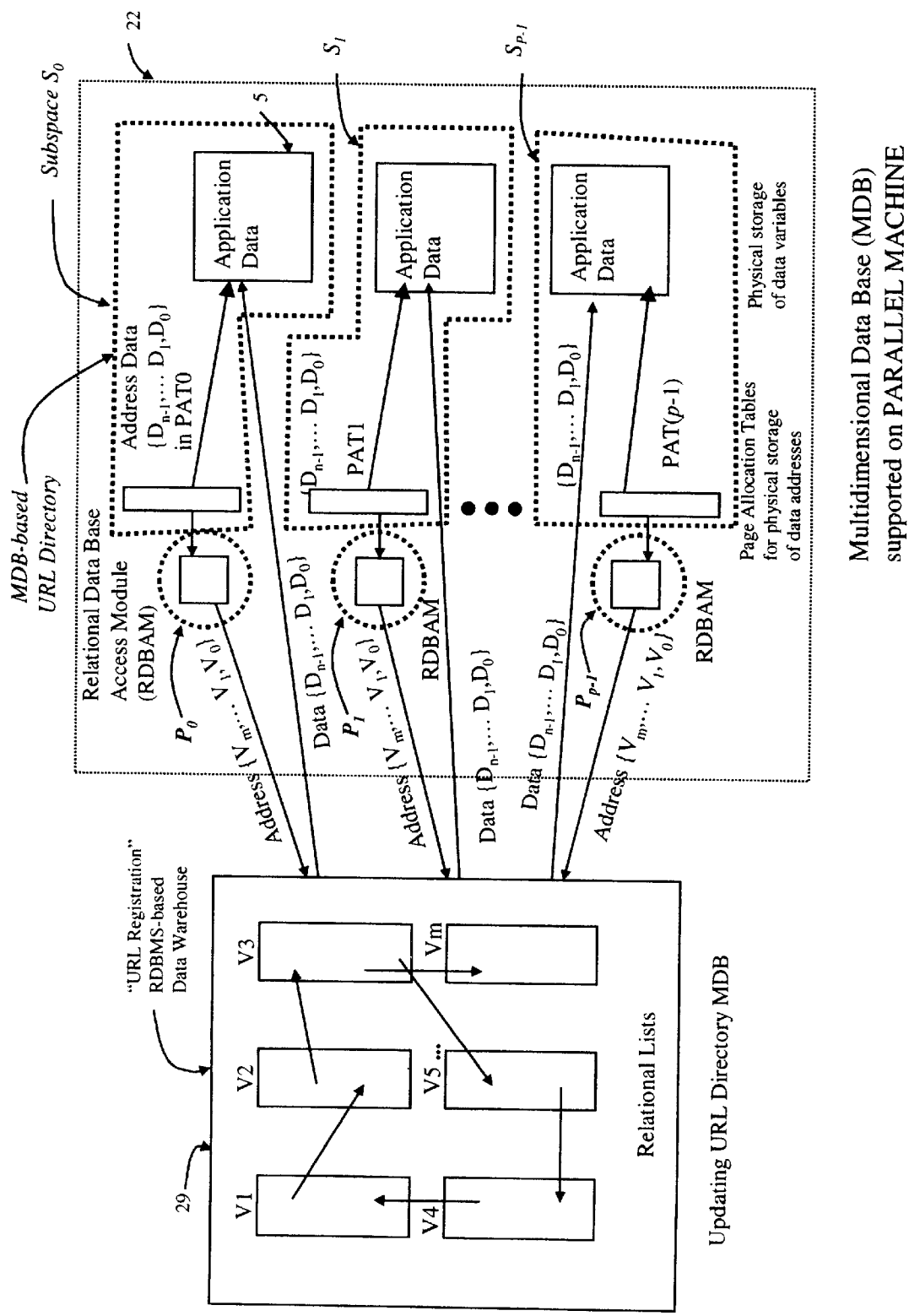
FIG. 16 is a schematic representation of the parallel computing machine of FIG. 15A, illustrating the parallel loading of data from the RDBMS-based URL registration Data Warehouse, to the MDB-based URL Directory supported on the parallel computing machine, using the data element address assignment method (i.e. address data mapping method) shown in FIG. 8A.

As shown in FIG. 16, MDB-based URL directory of the system 20 is updated by loading data elements from the RDBMS Data Warehouse 29 into the storage volumes 5 of the MDB URL Directory using the novel modular-arithmetic based address data mapping scheme of the present invention, described in detail hereinabove. Also, updating operations of the MDB-based URL directory will typically require the shifting of data elements within the MDB, using the address data mapping scheme as well, in order to reflect any changes made in the information classification scheme since the last updating operation.

Personalized E-Commerce On-Line Shopping System of the Present Invention

The address data mapping method of the present invention can be used to provide an improved system and method of generating personalized e-commerce-enabled (on-line) shopping environments (i.e. personalized e-stores) using information accessed from an MBD containing consumer shopping profile information. In such an application shown in FIGS. 17 and 18, there may or may not be any need for data aggregation as in the above-described MOLAP application.

Figure 17:
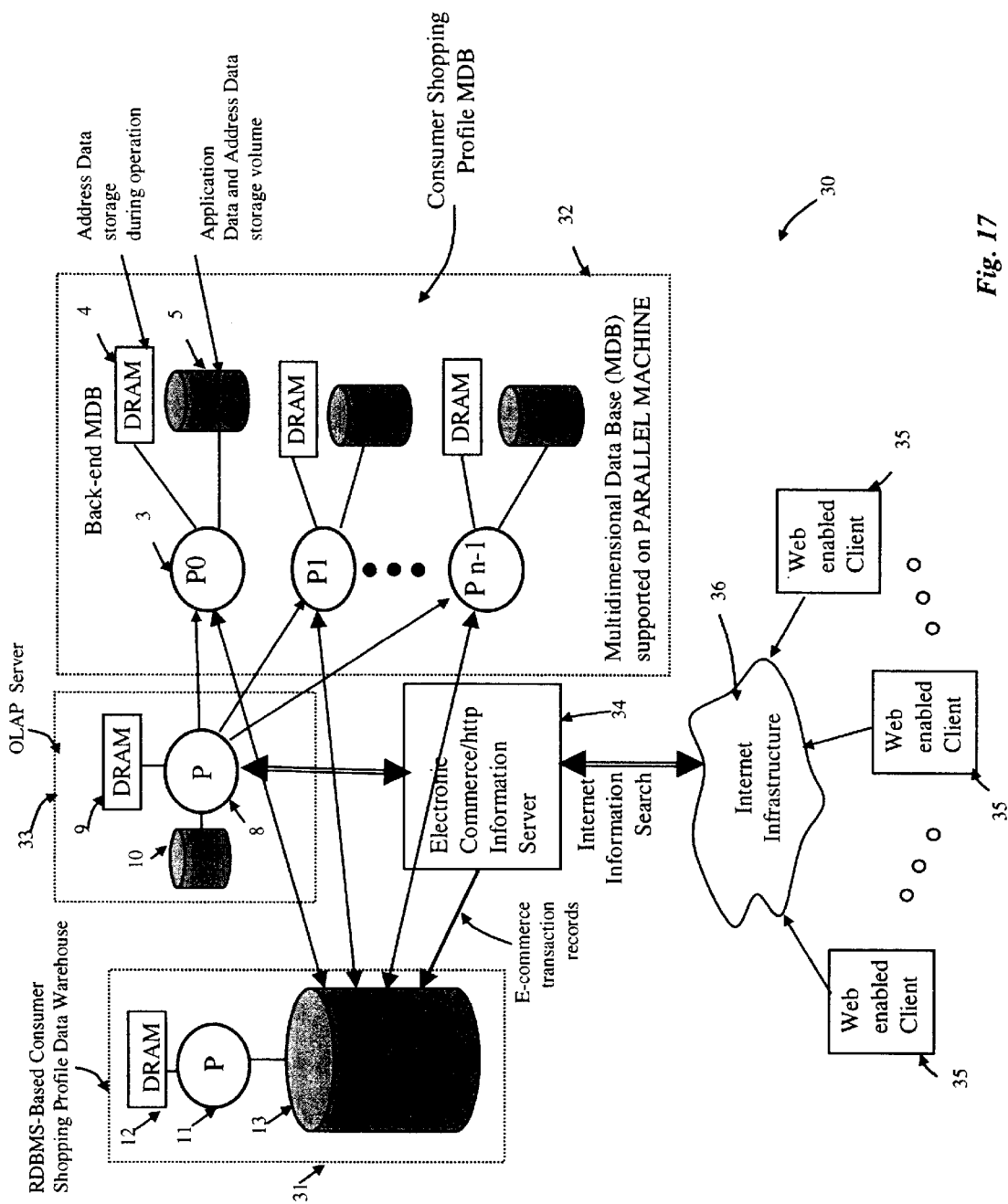
FIG. 17 is a schematic representation of a personalized on-line e-commerce shopping system according to the present invention, wherein a parallel computing machine, of the type shown in FIG. 6, is used to realize the consumer shopping profile MDB based thereof; whereas a RDBMS is used to realize the consumer shopping profile Data Warehouse thereof.

As shown in FIG. 17, the personalized on-line shopping system 30 of the present invention comprises: a RDBMS-based consumer shopping profile Data Warehouse 31 for storing consumer shopping profile information (e.g. representative of buying patterns, interests, hobbies as a function of time, personal information, credit history, income, home and auto ownership, marital status, etc.) collected from electronic commerce based transactions, compiled databases, publicly-traded response databases and the like; a consumer shopping profile MDB 32, realized on parallel computing flat form similar to 2 in FIG. 6. for storing consumer shopping profile data, loaded from the Data Warehouse 31; an Express™ OLAP server 33; and one or more electronic commerce information servers 34 connected to the Data Warehouse 31 and the Express OLAP server 33, for supporting one or more personalized on-line shopping WWW sites over the Internet, and transferring consumer transaction records to the Data Warehouse 31 after each consumer transaction. The dimensions of the MDB 32 will be selected on the basis of the consumer shopping profile attributes mined from RDBMS Data Warehouse 31.

Figure 18:
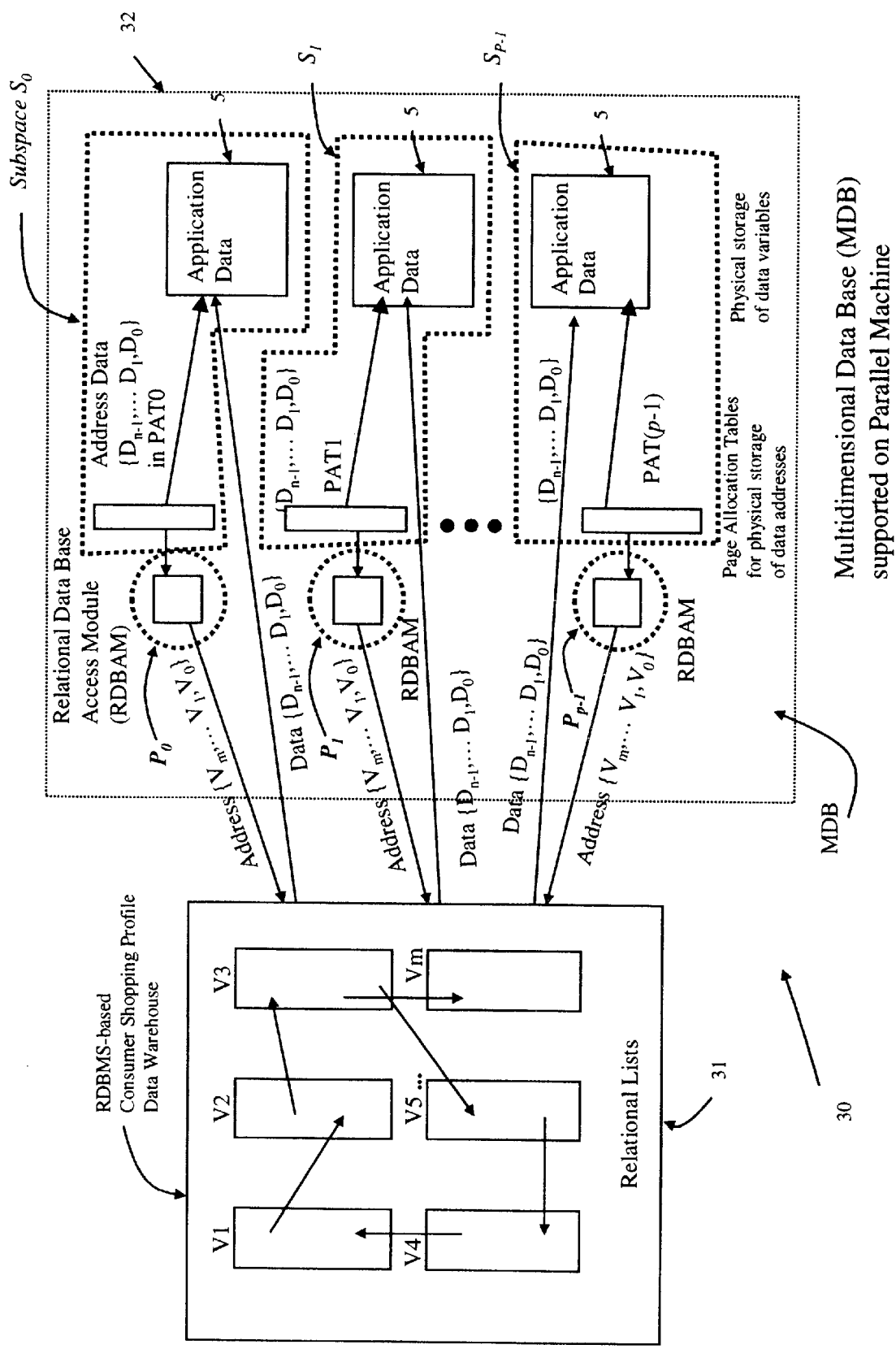
FIG. 18 is a schematic representation of the parallel computing machine of FIG. 17, illustrating the parallel loading of data from the consumer shopping profile Data Warehouse, to the consumer shopping profile MDB supported on the parallel computing machine, using the data element address assignment method (i.e. address data mapping method) shown in FIG. 8A.

As shown in FIG. 18, first step of the personalized on-line shopping method hereof involves collecting consumer shopping profile information (e.g. representative of buying patterns, interests, hobbies, personal information, credit history, income, home and auto ownership, marital status, etc.) from electronic commerce based transactions, compiled databases, publicly-traded response databases and the like, and storing such information within the RDBMS-based Data Warehouse 31, as shown in FIG. 17.

The second step of the personalized on-line shopping method involves loading raw consumer shopping profile information from the Data Warehouse 31 to the MDB 32 using the parallel computing platform and parallelized data loading processes of the present invention described in great detail hereinabove.

The third step of the personalized on-lie shopping method involves pre-aggregating (i.e. precompiling) the consumer shopping profile information within the MDB 32 using the parallel computing platform and parallelized data aggregation processes of the present invention, described in great detail hereinabove.

The fourth step of the personalized on-line shopping method involves indentifying, during each on-line shopping transaction, the Web-enabled consumer engaged in on-line shopping through a particular WWW site, using a Web-enabled client machine 35 equipped with an http client (browser) program and, connected to the infrastructure of the Internet 36.

The fifth step of the personalized on-line shopping method involves accessing from the MDB 32, personal shopping information maintained on the identified consumer/shopper, and using the same, in order to construct (in real-time) personalized (i.e. customized) Web-pages that subject the consumer to a personalized shopping environment that reflects his or her interests, tastes, desires, values and/or expectations.

The sixth step of the personalized on-line shopping method involves analyzing, at the end of each such transaction, the collected set of data collected on the consumer from his or her shopping and/or browsing activities, in order to mine for particular consumer shopping attributes preclassified within the RDBMS Data Warehouse 31.

The seventh step of the personalized on-line shopping method involves storing such analyzed data within the RDBMS Data Warehouse 31.

The eighth step of the personalized on-line shopping method involves using the Express™ Server 33 to periodically upload the data from the continuously updated Data Warehouse 31 into the MDB 32.

Thereafter if necessary, the raw data loaded into the MDB 32 is pre-aggregated. The information stored within the MDB subsystem 32 reflects current personal shopping profiles of the consumers (e.g. consumer and consumer households alike) represented therewithin.

Other Applications of the Present Invention

It is contemplated that the address data mapping processes of the present invention can be embodied within the MDB subsystem 32 used to manage multiple dimensions of information for real-time control of packet routers, switches and other devices used within the infrastructure of the Internet. The advantage of using the MDB subsystem 32 of the present invention is that pre-aggregated information contained therein cane be quickly accessed in real-time to control events on the Internet in a real-time manner.

The address data mapping processes of the present invention can be embodied within an MDB used to manage multiple dimensions of information for real-time control of automated parcel (e.g. package) routing and sortation systems so that packages automatically identified, dimensioned and weighed while being transported along a conveyor belt, can be routed to their destinations along a least-cost shipping route based on a hierarchy of information dimensions reflected within the MDB of the system.

The address data mapping processes of the present invention can be embodied within an MDB subsystem used a MOLAP environment for answering questions about corporate performance in a particular market, economic trends, consumer behaviors, weather conditions, population trends, or the state of any physical, social, biological or other system or phenomenon on which different types or categories of information, organizable in accordance with a predetermined dimensional hierarchy, are collected and stored within a RDBMS of one sort or another. Regardless of the particular application selected, the address data mapping processes of the present invention will provide a quick and efficient way of managing a MDB and also enabling decision support capabilities utilizing the same in diverse application environments.

It is understood that the System and Method of the illustrative embodiments described hereinabove may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. A system for accessing data elements within a multi-dimensional database (MDB) comprising:
    a parallel computing platform having a plurality of processors and one or more storage volumes, wherein each processor is associated with Processor Storage Space within said storage volumes for physically storing data elements thereof and wherein the location of each data element in said MDB is specified in MBD Space by inter-encoded business dimensions associated with said data element;
    a data loading mechanism, associated with said parallel computing platform, for loading in the integer-encoded business dimensions and associated data elements from a data warehouse;
    an address data mapping mechanism, associated with said data loading mechanism, for mapping the integer-encoded business dimensions associated with each said data element to a processor identifier, and for mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and
    a data accessing mechanism in cooperation wit said address data mapping mechanism, for accessing each said data element in said one or more storage volumes using said integer-encoded data storage address mapped thereto.

2. The system of claim 1, wherein said address data mapping mechanism comprises means for mapping said integer-encoded business dimensions into said integer-encoded data storage address for each said data element using a modular arithmetic function.

3. The system of claim 2, wherein parallel data loading operations are carried out by said data loading mechanism.

4. The system of claim 2, wherein parallel data aggregation operations are carried out within said MDB using said modular arithmetic function which maps said integer-encoded business dimensions associated with raw or previously pre-aggregated data elements to be stored within said MDB, into integer-encoded data storage addresses within said storage volumes at which the pre-aggregated data elements are to be stored.

5. The system of claim 4, wherein OLAP operations are carried out within said MDB using said modular arithmetic function which maps said integer-encoded business dimensions associated with pre-aggregated data elements to be accessed from said MDB, into integer-encoded data storage addresses within said storage volumes, from which said pre-aggregated data elements are to be accessed.

6. The system of claim 1, wherein data processing tasks carried out therein are evenly distributed among said plurality of processors on said parallel computing platform.

7. The system of claim 1, wherein data elements within said MDB are evenly distributed among said plurality of processors on said parallel computing platform.

8. The system of claim 1, wherein each said processor on said parallel computing platform handles data elements assigned thereto during data elements address assignment operations carried out during parallel data loading operations between said data warehouse and said MDB within said system.

9. The system of claim 1, wherein each said processor on said parallel computing platform handles data elements assigned thereto during data elements address assignment operations carried out during parallel data aggregation operations within said MDB of said system.

10. The system of claim 1, wherein interprocessor communication among said plurality of processors is minimized during parallel data loading operations carried out between said data warehouse and said MDB on said parallel computing platform.

11. The system of claim 1, wherein interprocessor communication among said plurality of processors is minimized during parallel data aggregation operations carried out within said MDB on said parallel computing platform.

12. The system of claim 1, wherein interprocessor communication among said plurality of processors is minimized during OLAP operations carried out within said MDB on said parallel computing platform.

13. The system of claim 1, wherein said data warehouse comprises a relational database management system (RDBMS).

14. The system of claim 1, wherein said address data mapping mechanism maps the, integer-encoded business dimensions associated with each said data element into integer-encoded data storage addresses witin data storage based upon the following formula:

$$Loc(D0,D1,Dn)=[D0+sizeD0*(D1+sizeD1*(\ldots *Dn)))/p].$$

15. The system of claim 1, wherein said address data mapping mechanism maps the integer-encoded business dimensions associated with each said data element to a processor identifier using a modular arithmetic function based on the number of processors of said parallel platform.

16. A method of accessing data elements within a multi-dimensional database MDB) comprising:
    (a) providing a parallel computing platform having a plurality of processors and one or more storage volumes, wherein each processor is associated with Processor Storage Space within said storage volumes for physically storing data elements therein, and wherein the location of each data element in said MDB is specified in MDB Space by integer-encoded business dimensions associated with said data element;
    (b) loading in the integer-encoded business dimensions and associated data elements from a data warehouse;
    (c) mapping the integer-encoded business dimensions associated with each said data element to a processor identifier, and mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said dam element; and
    (d) using said integer-encoded data storage addresses to access said data elements from said one or more storage volumes.

17. The method of claim 16, wherein step (c) comprises mapping said integer-encoded business dimensions for each said data element into said integer-encoded data storage address using a modular arithmetic function.

18. The method of claim 16, wherein step (b) comprises parallel data loading operations carried out between said data warehouse and said MBD and step (c) comprises using a modular-arithmetic function to map said integer-encoded business dimensions associated with each raw data element accessed from said data warehouse, into an integer-encoded data storage address within one of said storage volumes associated with said MDB.

19. The method of claim 18, wherein OLAP operations are carried out within said MDB and step (c) comprises using said modular arithmetic function to map said integer-encoded business dimensions associated with pre-aggregated data elements to be accessed from said MBD, into integer-encoded data storage addresses within said storage volumes, from which said pre-aggregated data elements are to be accessed.

20. The method of claim 16, wherein parallel data aggregation operations are carried out within said MDB and step (c) comprises using a modular arithmetic function to map said integer-encoded business dimensions associated with raw or previously pre-aggregated data elements to be stored within said MDB, into integer-encoded data storage addresses within said storage volumes at which the pre-aggregated data elements are to be stored.

21. The method of claim 16, wherein data processing tasks carried out therein are evenly distributed among said plurality of processors on said parallel computing platform.

22. The method of claim 13, wherein data elements within said MDB are evenly distributed among said plurality of processors on said parallel computing platform.

23. The method of claim 16, wherein each said processor on said parallel computing platform handles data elements assigned thereto during data elements address assignment operations carried out during parallel data loading operations between said data warehouse and said MDB within said system.

24. The method of claim 16, wherein interprocessor communication among said plurality of processors is minimized dug parallel data loading operations carried out in step (b).

25. The method of claim 16, wherein interprocessor communication among said plurality of processors is minimized during parallel data loading operations carried out between a relational database management system (RDSMS) and said MDB on said parallel computing platform.

26. The method of claim 16, wherein interprocessor communication among said plurality of processors is minimized during parallel data aggregation operations carried out within said MDB on said parallel computing platform.

27. The method of claim 16, wherein interprocessor communication among said plurality of processors is minimized during OLAP operations carried out within said MDB on said parallel computing platform.

28. The method of claim 16, wherein said data warehouse comprises a relational database management system (RDBMS).

29. The method of claim 16, wherein said mapping step maps the integer-encoded business dimensions associated with each said data element into integer-encoded data storage addresses within said data storage based upon the following formula:

$$\mathrm{Loc}(D0,D1,Dn) = [D0 + \mathrm{size}D0 * (D1 + \mathrm{size}D1 * (\ldots *Dn)))]/p].$$

30. The method of claim 16, wherein said mapping step maps the integer-encoded business dimensions associated with each said data element to a processor identifier using a modular arithmetic function based on the number of processors of said parallel platform.

31. A system for managing data elements within a multidimensional database (MDB) comprising:
 a parallel computing platform having a plurality, of processors and one or more storage volumes wherein each processor is associated with Processor Storage Space within said storage volumes for physically storing data elements therein, and wherein the location of each data element in said MDB is specified in MDB Space by integer-encoded business dimensions associated with said data element;
 a data loading mechanism, associated with said parallel computing platform for loading in the integer-encoded business dimensions and associated data elements from a data warehouse;
 an address data mapping mechanism, in association with said data loading mechanism, for mapping the integer-encoded business dimensions associated with each said data element to a processor identifier, and for mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and
 a data management mechanism, in cooperation with said address data mapping mechanism, for managing each said data element in said one or more storage volumes using said integer-encoded data storage address mapped thereto.

32. The system of claim 31, wherein said address data mapping mechanism comprises means for mapping said integer-encoded business dimensions into said integer-encoded data storage address for each said data element using a modular arithmetic function.

33. The system of claim 31, wherein parallel data loading operations are carried out by said data loading mechanism.

34. The system of claim 32, wherein parallel data aggregation operations are carded out within said MDB using said modular arithmetic function which maps said integer-encoded business dimensions associated with raw or previously pre-aggregated data elements to be stored within said MDB, into integer-encoded data storage addresses wit said storage volumes at which the pre-aggregated data elements are to be stored.

35. The system of claim 32, wherein OLAP operations are carried out within said MDB using said modular arithmetic function which maps said integer-encoded business dimensions associated with pre-aggregated data elements to be accessed from said MDB, into integer-encoded data storage addresses within said storage volumes, from which said pre-aggregated data elements are to be accessed.

36. The system of claim 31, wherein data processing tasks carried out therein are evenly distributed among said plurality of processors on said parallel computing platform.

37. The system of claim 31, wherein data elements within said MDB are evenly distributed among said plurality of processors on said parallel computing platform.

38. The system of claim 31, wherein each said processor on said parallel computing platform handles data elements assigned thereto during data elements address assignment operations carried out during parallel data loading operations between said data warehouse and said MDB within said system.

39. The system of claim 31, wherein each said processor on said parallel computing platform handles data elements assigned thereto during data elements address assignment operations carried out during parallel data aggregation operations within said MDB of said system.

40. The system of claim 31, wherein interprocessor communication among said plurality of processors is minimized during parallel data loading operations carried out between said data warehouse and said MDB on said parallel computing platform.

41. The system of claim 31, wherein interprocessor communication among said plurality of processors is minimized during parallel data aggregation operations carried out within said MDB on said parallel computing platform.

42. The system of claim 31, wherein interprocessor communication among said plurality of processors is minimized during OLAP operations carried out within said MDB on said parallel computing platform.

43. The system of claim 31, wherein said data warehouse comprises a relational database management system (RDBMS).

44. The system of claim 31, wherein said address data mapping mechanism maps the integer-encoded business dimensions associated with each said data element into integer-encoded data storage addresses within data storage based upon the following formula:

$$\mathrm{Loc}(D0,D1,Dn) = [D0 + \mathrm{size}D0 * (D1 + \mathrm{size}D1 * (\ldots *Dn)))/p].$$

45. The system of claim 31, wherein said address data mapping mechanism maps the integer-encoded business dimensions associated with each said data element to a processor a identifier using a modular arithmetic function based on the number of processors of said parallel platform.

46. A method of managing data elements within a multidimensional database (MDB) comprising:
 (a) providing a parallel computing platform having a plurality of processors and one or more storage volumes, wherein each processor is associated with Processor Storage Space within said storage volumes for physically storing data elements therein, and wherein the location of each data element in said MDB is specified in MDB Space by integer-encoded business dimensions associated with said data element;
 (b) loading in the integer-encoded business dimensions and associated data elements from a data warehouse;
 (c) mapping the integer-encoded business dimensions associated with each said data element to a processor identifier, and mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and
 (d) using said integer-encoded data storage address for each said data element to manage said data element in said one or more storage volumes.

47. The method of claim 46, wherein step (c) comprises mapping said integer-encoded business dimensions into said integer-encoded data storage address for each said data element using a modular arithmetic function.

48. The method of claim 46, wherein parallel data loading operations are carried out in step (b) comprises using a modular-arithmetic function to map said integer-encoded business dimensions associated with each raw data element accessed from said data warehouse, into an integer-encoded data storage address within one of said storage volumes associated with said MDB.

49. The method of claim 46, wherein parallel data aggregation operations are cared out within said MDB and step (c) comprises using said modular arithmetic function to map said integer-encoded business dimensions associated with raw or previously pre-aggregated data elements to be stored within said MDB, into integer-encoded data storage addresses wit said storage volumes at which the pre-aggregated data elements are to be stored.

50. The method of claim 46, wherein OLAP operations are carried out within said MDB and step (c) comprises using said modular arithmetic function to map said integer-encoded business dimensions associated with pre-aggregated data elements to be accessed front said MDB, into integer-encoded data storage addresses within said storage volumes, from which asid pre-aggregated data elements are to be accessed.

51. The method of claim 46, wherein data processing tasks carried out on said parallel computing platform are evenly distributed among said plurality of processors on said parallel computing platform.

52. The method of claim 46, wherein data elements with said MDB are evenly distributed among said plurality of processors on said parallel computing platform.

53. The method of claim 46, wherein each said processor on said parallel computing platform handles data elements assigned thereto during data elements address assignment operations carried out during parallel data loading operations between said data warehouse and said MDB witin said system.

54. The method of claim 46, wherein each said processor on said parallel computing platform handles data elements assigned thereto during data elements address assignment operations carried out during parallel data aggregation operations within said MDB of said system.

55. The method of claim 46, wherein interprocessor communication among said plurality of processors is minimized during parallel data loading operations carried out in step (b).

56. The method of claim 46, wherein interprocessor communication among said plurality of processors is minimized (luring parallel data aggregation operations carried out within said MDB on said parallel computing platform.

57. The method of claim 46, wherein interprocessor communication among said plurality of processors is minimized during OLAP operations carried out within said MDB on sad parallel computing platform.

58. The method of claim 46, wherein said data warehouse comprises a relational database management system (RDBMS).

59. The method of claim 46, wherein said mapping step maps the integer-encoded business dimensions associated with each said data element into integer-encoded data storage addresses within said data storage based upon the following formula:

$$\mathrm{Loc}(D0,D1,Dn) = [D0 + \mathrm{size}D0 * (D1 + \mathrm{size}D1 * (\ldots *Dn)))/p].$$

60. The method of claim 46, wherein said mapping step maps the integer-encoded business dimensions associated with each said data element to a processor identifier using a modular arithmetic function based on the number of processors of said parallel platform.

61. A system for accessing data elements within a multidimensional database (MDB) comprising:
 a parallel computing platform having a plurality of processors and associated data storage, wherein each processor is assigned a unique integer-encoded data storage address space in said data storage for storing data elements therein, and wherein location of each data element in said MDB is specified in MDB Space by integer-encoded business dimensions associated with said data element;

a data loading mechanism, associated with said parallel computing platform, for loading in the integer-encoded business dimensions and associated data elements from a data warehouse;

an address data mapping mechanism, associated with said data loading mechanism, for mapping the integer-encoded business dimensions associated with each said data element to a processor identifier, and for mapping the integer-encoded business dimensions associated with each said data element into integer-encoded data storage addresses within data storage address space associated with a specific processor identified by the processor identifier corresponding to said integer-encoded business dimensions based upon size of the integer encoded business dimensions; and a data accessing mechanism, in cooperation with said address mapping mechanism, for accessing a given data element in said data storage using the integer-encoded data storage address associated with the given data element.

62. The system of claim 61, wherein said address data mapping mechanism comprises means for mapping said integer-encoded business dimensions into said integer-encoded data storage addresses using a modular arithmetic function.

63. The system of claim 62, wherein parallel data loading operations are carried out by said data loading mechanism.

64. The system of claim 62, wherein parallel data aggregation operations are carried out within said MDB using said modular arithmetic function which maps said integer-encoded business dimensions associated with raw or previously pre-aggregated data elements to be stored within said MDB into integer-encoded data storage addresses within said data storage at which the aggregated data elements are to be stored.

65. The system of claim 64, wherein OLAP operations are carried out within said MDB using said modular arithmetic function which maps said integer-encoded business dimensions associated with pre-aggregated data elements to be accessed from said MDB, into integer-encoded data storage addresses within said data storage, from which said pre-aggregated data elements are to be accessed.

66. The system of claim 61, wherein data processing tasks carried out therein are evenly distributed among said plurality of processors on said parallel computing platform.

67. The system of claim 61, wherein said mapping performed by said address data mapping mechanism evenly distributes data elements among said integer-encoded data storage address space in said data storage associated with said plurality of processors of said parallel computing platform.

68. The system of claim 61, wherein each said processor on said parallel computing platform handles data elements assigned thereto during data elements address assignment operations carried out during parallel data loading operations carried out by between said data warehouse and said MDB within said system.

69. The system of claim 61, wherein each said processor on said parallel computing platform handles data elements assigned thereto during data elements address assignment operations carried out during parallel data aggregation operations within said MDB of said system.

70. The system of claim 61, wherein interprocessor communication among said plurality of processors is minimized during parallel data loading operations carried out between said data warehouse and said MDB on said parallel computing platform.

71. The system of claim 61, wherein interprocessor communication among said plurality of processors is minimized during parallel data aggregation operations carried out within said MDB on said parallel computing platform.

72. The system of claim 61, wherein interprocessor communication among said plurality of processors is minimized during OLAP operations carried out within said MDB on said parallel computing platform.

73. The system of claim 61, wherein said integer-encoded address space in said data storage comprises a virtual address space, and said system further comprises a virtual data storage management system for mapping said virtual address space to real address space accessible on a storage device.

74. The system of claim 61, wherein said data warehouse comprises a relational database management system (RDBMS).

75. The system of claim 61, wherein said address data mapping mechanism maps the integer-encoded business dimensions associated with each said data element into integers encoded data storage addresses within data storage based upon the following formula:

$$\text{Loc}(D0,D1,Dn)=[D0+\text{size}D0*(D1+\text{size}D1*(\ldots *Dn)))/p].$$

76. The system of claim 61, wherein said address data mapping mechanism maps the integer-encoded business dimensions associated with each said data element to a processor identifier using a modular arithmetic function based on the number of processors of said parallel platform.

77. A method for accessing data elements within a multidimensional database (MDB) comprising the steps of:

providing a parallel computing platform having a plurality of processors and associated data storage, wherein each processor is assigned a unique integer-encoded data storage address space in said data storage for storing data elements therein, and wherein location of each data element in said MDB is specified in MDB Space by integer-encoded business dimensions associated with said data element;

loading in the integer-encoded business dimensions and associated data elements from a data warehouse;

mapping the integer-encoded business dimensions associated with each said data element to a processor identifier, and mapping the integer-encoded business dimensions associated with each said data clement into integer-encoded data storage addresses within data storage address space associated with a specific processor identified by tee processor identifier corresponding to said integer-encoded business dimensions based upon size of the integer encoded business dimensions; and accessing a given data element in said data storage using the integer-encoded data storage address associated with the given data element.

78. The method of claim 77, wherein said mapping steps use a modular arithmetic function.

79. The method of claim 78, further comprising the step of:

performing parallel data loading operations between said data warehouse and said MDB using said modular arithmetic function which maps said integer-encoded business dimensions associated with each raw data element accessed from said RDBMS, into an integer-encoded data storage address within said data storage.

80. The method of claim 78, further comprising the step of:
performing parallel data aggregation operations within said MDB using said modular arithmetic function which maps said integer-encoded business dimensions associated with raw or previously pre-aggregated data elements to be stored within said MDB, into integer-encoded data storage addresses within said data storage at which the pre-aggregated data elements are to be stored.

81. The method of claim 80, further comprising the steps of:
performing OLAP operations within said MDB using said modular arithmetic function which maps said integer-encoded business dimensions associated with pre-aggregated data elements to be accessed from said MDB, into integer-encoded data storage addresses with said data storage, from which said pre-aggregated data elements are to be accessed.

82. The method of claim 77, wherein data processing tasks carried out on said MDB are evenly distributed among said plurality of processors on said parallel computing platform.

83. The method of claim 77, wherein said mapping performed by said address data mapping mechanism evenly distributes data elements among said integer-encoded data storage address space in said data storage associated with said plurality of processors of said parallel computing platform.

84. The method of claim 77, wherein each said processor on said parallel computing platform handles data elements assigned thereto during data elements address assignment operations carried out during parallel data loading operations between said data warehouse and said MDB within said system.

85. The method of claim 77, wherein each said processor on said parallel computing platform handles data elements assigned thereto during data elements address assignment operations carried out during parallel data aggregation operations within said MDB of said system.

86. The method of claim 77, wherein interprocessor communication among said plurality of processors is minimized during parallel data loading operations carried out between said data warehouse and said MDB on said parallel computing platform.

87. The method of claim 77, wherein interprocessor communication among said plurality of processors is minimized during parallel data aggregation operations carried out within said MDB on said parallel computing platform.

88. The method of claim 77, wherein interprocessor communication among said plurality of processors is minimized during OLAP operations carried out within said MDB on said parallel computing platform.

89. The method of claim 77, wherein said integer-encoded address space in said data storage comprises a virtual address space, further comprising the step of mapping said virtual address space to real address space accessible on a storage device.

90. The method of claim 77, wherein said data warehouse comprises a relational database management system (RDBMS).

91. The method of claim 77, wherein said mapping step maps the integer-encoded business dimensions associated with each said data element into integer-encoded data storage, addresses within said data storage based upon the following formula:

$$Loc(D0,D1,Dn)=[D0+sizeD0*(D1+sizeD1*(\ldots*Dn))]/p].$$

92. The method of claim 77, wherein said mapping step maps the integer-encoded business dimensions associated with each said data element to a processor identifier using a modular arithmetic function based on the number of processors of said parallel platform.

93. An Internet URL Directory system for supporting on-line information searching operations by Web-enabled client machines, said Internet URL Directory system comprising:
a parallel computing platform having a plurality of processors and one or more storage volumes for physically storing a plurality of data elements of a multidimensional database (MDB) in said one or more storage volumes, wherein each processor is associated with Processor Storage Space within said storage volumes for physically storing data elements therein and wherein the location of each data element in said MDB is specified in NDB Space by integer-encoded business dimensions associated with said data element;
a data loading mechanism, associated with said parallel computing platform, for loading in the integer-encoded business dimensions and associated data elements from a data warehouse;
an address data mapping mechanism, associated with said data loading mechanism, for mapping the integer-encoded business dimensions associated with each said data element to a processor identifier, and for mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and
a data accessing mechanism, in cooperation with said address mapping mechanism, for accessing each said data element in said one or more storage volumes using said integer-encoded data storage address mapped thereto.

94. An Internet-enabled system for supporting real-time control of processes in response to complex states of information reflected in a multi-dimensional database (MDB), said Internet-enabled system comprising:
a parallel computing platform having a plurality of processors and one or more storage volumes for physically storing a plurality of data elements of a multidimensional database (MDS) in said one or more storage volumes at integer-encoded physical addresses specified in Processor Storage Space, and wherein the location of each data element in said MDB is specified in MDB Space by integer-encoded business dimensions associated with said data element;
a data loading mechanism, associated with said parallel computing platform, for loading in the integer-encoded business dimensions and associated data elements from a data warehouse;
an address data mapping mechanism associated with said data loading mechanism, for mapping the integer-encoded business dimensions associated with each said data element to a processor identifier, and for mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and a data accessing mechanism, in cooperation with said address mapping mechanism, for accessing each said data element in said one or more storage volumes using said integer-encoded data storage address mapped thereto.

95. A system for accessing data elements within a multidimensional database (MDB) comprising:

a parallel computing platform having a plurality of processors and one or more storage volumes, wherein each processor is associated with Processor Storage Space within said storage volumes for physically storing data elements therein, and wherein the location of each data element in said MDB is specified in MDB Space by business dimensions associated with said data element;

a data loading mechanism, associated with said parallel computing platform, for loading in the integer-encoded business dimensions and associated data elements from a data warehouse;

an address data mapping mechanism, associated with said data loading mechanism, for mapping the integer-encoded business dimensions associated with each said data element to a processor identifier, and for mapping the integer-encoded business dimensions associated with each said data element into an integer-encoded data storage address within Processor Storage Space associated with a specific processor identified by the processor identifier corresponding to said integer-encoded business dimensions based upon size of the integer-encoded business dimensions for each said data element; and a data accessing mechanism, in cooperation with said address mapping mechanism, for accessing each said data element in said one or more storage volumes using said data storage address mapped thereto.

* * * * *